US005821943A

United States Patent [19]

Shashua

[11] Patent Number: 5,821,943
[45] Date of Patent: Oct. 13, 1998

[54] APPARATUS AND METHOD FOR RECREATING AND MANIPULATING A 3D OBJECT BASED ON A 2D PROJECTION THEREOF

[75] Inventor: Amnon Shashua, Hod Hasharon, Israel

[73] Assignee: Cognitens Ltd., Ramat Hasharon, Israel

[21] Appl. No.: 497,224

[22] Filed: Jun. 30, 1995

[30] Foreign Application Priority Data

Apr. 25, 1995 [IL] Israel ........................................ 113496

[51] Int. Cl.$^6$ .................................................. G06T 15/00
[52] U.S. Cl. .......................... 345/427; 345/419; 382/201
[58] Field of Search ........................... 382/190, 201–202; 395/119, 127, 140–143; 345/419–420, 427, 433–439, 440–443

[56] References Cited

U.S. PATENT DOCUMENTS

| 5,303,337 | 4/1994 | Ishida | 395/119 |
|---|---|---|---|
| 5,344,298 | 9/1994 | Hull | 425/135 |
| 5,363,476 | 11/1994 | Kurashige | 395/125 |
| 5,412,764 | 5/1995 | Tanaka | 395/124 |
| 5,454,371 | 10/1995 | Fenster et al. | 600/443 |
| 5,559,334 | 9/1996 | Gupta et al. | 250/360.1 |

OTHER PUBLICATIONS

Luong, Q.–T., et al., "Self–calibration of a camerma using multiple views", *IEEE, Pattern Recognition, 1992 11th International Conference*, vol. I: Conference A, pp. 9–12.

Reiss, "Features Invariant to Linear Transformations in 2D and 3D", *IEEE Pattern Recognition, 1992, 11th international*, vol. III: conference C, 1992, pp. 493–496.

Shashua, A.; Navab, N., "Relative Affine Structure: Theory and Application to 3D Reconstruction from Perspective Views", *Proceedings of IEEE Conference on Computer Vision and Pattern Recognition, IEEE Comput. Soc. Press*, 21–23 Jun. 1994 pp. 483–489.

Shashua, A.; Werman, M., "Trilinearity of Three Perspective Views and Its Associated Tensor", *Proceedings. Fifth International Conference on Computer Vision (Cat. No.95CB35744) IEEE Comput. Soc. Press*, 20–23 Jun. 1995, pp. 920–925.

Tiggs, Bill, "Matching Constraints and the Joint Image", *Proceedings of the 5th International Conference on Computer Vision, IEEE International Conference on Computer Vision 1995 held on Jun. 20–23, 1195, IEEE, Piscataway, NJ, USA, 95CH35744*. pp. 338–343.

Weinshall, D.; Werman, M.; Shashua, A., "Shape Tensors for Efficient and Learnable Indexing", *Proceedings IEEE Workshop on Representation of Visual Scenes, IEEE Comput. Soc. Press*, 24 Jun. 1995, pp. 58–65.

Weng, et al, "Motion and Structure from Line Correspondence: Closed–Form Solution, Unigueness, and Optimization", *IEEE Transactions on Pattern Analysis and Machine Intelligence* vol. 14 No. 3 Mar. 1992, pp. 318–336.

Westin, Carl–Fredrik; Knutsson, Hans, "Estimation of Motion Vector Fields Using Tensor Field Filtering", IEEE Image Processing, 1994 International Conference, 14–16, Jun. 1994, pp. 237–241.

(List continued on next page.)

*Primary Examiner*—Rudolph J. Buchel, Jr.
*Attorney, Agent, or Firm*—Ladas & Parry

[57] ABSTRACT

A method for generating information regarding a 3D object from at least one 2D projection thereof, the method comprising providing at least one 2D projection of a 3D object, generating an array of numbers described by:

$$\alpha_{ijk} = v_i' b_{jk} - v_j'' a_{ik} (i,j,k=1,2,3),$$

where $a_{ij}$ and $b_{jk}$ are elements of matrices A and B respectively and $v_i'$ and $v_i''$ are elements of vectors v' and v'' respectively, wherein the matrices and vectors together describe camera parameters of three views of the 3D object and employing the array to generate information regarding the 3D object.

113 Claims, 12 Drawing Sheets

OTHER PUBLICATIONS

Boerner, et al, "Development of Polarimetric Vector Signal and Tensor Image Processing in Wideband Interferometric POL–RAD/SAR Signature Analysis", *IEEE Geoscience and Remote Sensing, 1994 Symposium*, Apr. 1994, pp. 1121–1123.

Faugeras, et al, "About the Correspondence of Points Between N Images", IEEE Representation of Visual Scenes, 1995 Workshop, pp. 37–44.

Hartley, Richard I., "Linear method for reconstruction from lines and points", *Proceedings of the 5th international Conference on Computer Vision, IEEE International Conference on Computer Vision 1995 held on Jun. 20–23, 1195, IEEE, Piscataway, NJ, USA, 95CH35744*. pp. 882–887.

Hartley, Richard I., "Projective reconstruction and invariants from multiple images", *IEEE Transactions on Pattern Analysis and Machine Intelligence* vol. 16 No. 10 Oct. 1994, pp. 1036–1041.

Hartley, Richard I., "Computing Matched–epipolar Projections", *Proceedings of the 1994 IEEE Computer Society, Conference on Computer Vision and Pattern Recognition*, Jun. 21–23, 1994, pp. 903–907.

Hartley, Richard I., "An Algorithm for Self Calibration from Several Views", *Proceedings of the 1994 IEEE Computer Society, Conference on Computer Vision and Pattern Recognition*, Jun. 21–23, 1994, pp. 549–555.

Hartley, Richard I., "Lines and Points in Three Views—A Unified Approach", *Proceedings 1994 Image Understanding Workshop*, Sponsored by Advanced Research Projects Agency, Nov. 13–16, 1994, pp. 1009–1016.

Hartley, Richard, et al, "Stereo From Uncalibrated Cameras", *IEEE Computer Vision and Pattern Recognition*, 1992, pp. 761–764.

Hartley, Richard I., "Projective Reconstruction from Line Cerrespondence", *Proceedings of the 1994 IEEE Computer Society, Conference on Computer Vision and Pattern Recognition*, Jun. 21–23, 1994, pp. 903–907.

Bronshtein & Semendyayev, Handbook of Mathematics, 1985, pp. 808–826.

APPARATUS AND METHOD FOR RECREATING AND MANIPULATING A 3D OBJECT BASED ON A 2D PROJECTION THEREOF

FIELD OF THE INVENTION

The present invention relates to apparatus and methods for processing 2D projections of 3D objects and particularly to apparatus and methods for geometric analysis of a 2D projection image.

BACKGROUND OF THE INVENTION

Publications describing state of the art methods for processing 2D projections of 3D objects, and technologies relevant thereto, are described in references cited hereinbelow.

The disclosures of all publications mentioned in the specification and of the publications cited therein are hereby incorporated by reference.

SUMMARY OF THE INVENTION

The present invention seeks to provide image transfer apparatus and methods which are useful for generating a novel view of a 3D scene from first and second reference views thereof.

The present invention also seeks to provide 3D scene reconstruction methods and apparatus for generating a 3D representation of a 3D scene from first, second and third views thereof.

The present invention also seeks to provide improved apparatus and methods for processing 2D projections of 3D objects.

The present invention also seeks to provide methods for reconstruction of a 3D object based on a trilinear tensor defined on three views of the 3D object.

The present invention additionally seeks to provide methods for image transfer for a 3D object based on a trilinear tensor defined on three views of the 3D object.

The present invention also seeks to provide an image transfer method for generating a novel view of a 3D scene from first and second reference views thereof, the method including providing first and second reference views of a 3D scene, employing geometric information regarding the first reference view, second reference view and novel view, respectively, to generate a trilinear tensor representing the geometric relationship between the first, second and novel views and generating the novel view by computing a multiplicity of novel view locations each corresponding to different first and second corresponding locations in the first and second reference views respectively based on the first and second corresponding locations and the trilinear tensor.

The step of providing may, for example, comprise scanning in the first and second reference images.

The step of employing may, for example, include the step of generating a set of first, second and third corresponding locations in the first reference view, second reference view and novel view, respectively.

There is thus provided, in accordance with a preferred embodiment of the present invention, an image transfer method for generating a novel view of a 3D scene from first and second reference views thereof, the method including providing first and second reference views of a 3D scene, employing geometric information regarding the first reference view, second reference view and novel view, respectively, to generate a trilinear tensor representing the geometric relationship between the first, second and novel views, and generating the novel view by computing a multiplicity of novel view locations each corresponding to different first and second corresponding locations in the first and second reference views respectively based on the first and second corresponding locations and the trilinear tensor.

Further in accordance with a preferred embodiment of the present invention, the step of providing includes scanning in the first and second reference images.

Still further in accordance with a preferred embodiment of the present invention, the step of employing includes the step of generating a set of first, second and third corresponding locations in the first reference view, second reference view and novel view, respectively.

There is also provided, in accordance with a preferred embodiment of the present invention, a 3D scene reconstruction method for generating a 3D representation of a 3D scene from first, second and third views thereof, the method including providing first, second and third views of a 3D scene, employing geometric information regarding the first, second and third views to generate a trilinear tensor representing the geometric relationship between the first, second and third views, and generating a 3D representation of the 3D scene from the trilinear tensor.

Further in accordance with a preferred embodiment of the present invention, the step of generating a 3D representation includes computing an epipolar geometric representation of the first and second views from the trilinear tensor, and generating the 3D representation from the epipolar geometric representation.

Also provided, in accordance with another preferred embodiment of the present invention, is image transfer apparatus for generating a novel view of a 3D scene from first and second reference views thereof, the apparatus including apparatus for providing first and second reference views of a 3D scene, a trilinear tensor generator operative to employ geometric information regarding the first reference view, second reference view and novel view, respectively, to generate a trilinear tensor representing the geometric relationship between the first, second and novel views, and a novel view generator operative to generate the novel view by computing a multiplicity of novel view locations each corresponding to different first and second corresponding locations in the first and second reference views respectively based on the first and second corresponding locations and the trilinear tensor.

Further provided, in accordance with another preferred embodiment of the present invention, is 3D scene reconstruction apparatus for generating a 3D representation of a 3D scene from first, second and third views thereof, the apparatus including apparatus for providing first, second and third views of a 3D scene, a trilinear tensor generator operative to employ geometric. information regarding the first, second and third views to generate a trilinear tensor representing the geometric relationship between the first, second and third views, and a 3D scene representation generator operative to generate a 3D representation of the 3D scene from the trilinear tensor.

Also provided, in accordance with another preferred embodiment of the present invention, is a method for generating information regarding a 3D object from at least one and preferably three 2D projections thereof, the method including providing at least one and preferably three 2D projections of a 3D object, generating an array of numbers described by:

$$\alpha_{ijk} = v_i' b_{jk} - v_j'' a_{ik} \ (i, j, k=1, 2, 3),$$

where $a_{ij}$ and $b_{jk}$ are elements of matrices A and B respectively and $v_i'$ and $v_i''$ are elements of vectors v' and v'' respectively, wherein the matrices and vectors together describe camera parameters of three views of the 3D object, and employing the array to generate information regarding the 3D object.

Also provided, in accordance with a preferred embodiment of the present invention, is a method for generating a new view of a 3D object from first and second existing views thereof having n corresponding points $p_i$ and $p_i'$ (i=1 . . . n), the method including generating a tensor $\alpha_{ijk}$, and plugging the values of points $p_i$ and $p_i'$ (i=1 . . . n) into trilinear forms, thereby to extract an x'', y'' value representing a location in the new view, and generating the new view on the basis of the result of the plugging in step.

Further provided, in accordance with a preferred embodiment of the present invention, is a method for reconstructing a 3D object from at least one and preferably three 2D projections thereof, the method including providing at least one and preferably three 2D projections of a 3D object, generating an array of numbers described by:

$$\alpha_{ijk} = v_i' b_{jk} - v_j'' a_{ik} \ (i, j, k=1, 2, 3),$$

where $a_{ij}$ and $b_{jk}$ are elements of matrices A and B respectively and $v_i'$ and $v_i''$ are elements of vectors v' and v'' respectively, wherein the matrices and vectors together describe camera parameters of three views of the 3D object, permuting the array into three homography matrices associated with three corresponding planes in 3D space, and employing the three homography matrices to reconstruct the 3D object.

Also provided, in accordance with a preferred embodiment of the present invention, is a visual recognition method including providing three perspective views of a 3D object between which a trilinear relationships exists, and employing the trilinear relationship between the views in order to perform visual recognition by alignment.

Further in accordance with a preferred embodiment of the present invention, the method also includes reprojecting the 3D object.

Still further in accordance with a preferred embodiment of the present invention, the information regarding the 3D object includes a reconstruction of the 3D object.

Additionally in accordance with a preferred embodiment of the present invention, the information regarding the 3D object includes at least one new view of the 3D object generated without reconstructing the 3D object.

Further in accordance with a preferred embodiment of the present invention, the at least one and preferably three 2D projections includes at least one aerial photograph.

Still further in accordance with a preferred embodiment of the present invention, the at least one and preferably three 2D projections includes at least one satellite photograph.

Further in accordance with a preferred embodiment of the present invention, the information regarding the 3D object comprises at least one coordinate of the 3D object.

Further in accordance with a preferred embodiment of the present invention, the 3D object includes an aerospace object.

Still further in accordance with a preferred embodiment of the present invention, the 3D object includes a large object such as a ship.

Further in accordance with a preferred embodiment of the present invention, the 3D object includes a nonexistent object.

Also provided, in accordance with a preferred embodiment of the present invention, is apparatus for generating information regarding a 3D object from at least one and preferably three 2D projections thereof, the apparatus including apparatus for providing at least one and preferably three 2D projections of a 3D object, an array generator operative to generate an array of numbers described by:

$$\alpha_{ijk} = v_i' b_{jk} - v_j'' a_{ik} \ (i, j, k=1, 2, 3),$$

where $a_{ij}$ and $b_{jk}$ are elements of matrices A and B respectively and $v_i'$ and $v_i''$ are elements of vectors v' and v'' respectively, wherein the matrices and vectors together describe camera parameters of three views of the 3D object, and an array analyzer employing the array to generate information regarding the 3D object.

Also provided, in accordance with a preferred embodiment of the present invention, is apparatus for generating a new view of a 3D object from first and second existing views thereof having n corresponding points $p_i$ and $p_i'$ (i=1 . . . n), the apparatus including apparatus for generating a tensor $\alpha_{ijk}$, and apparatus for plugging the values of points $p_i$ and $p_i'$ (i=1 . . . n) into trilinear forms, thereby to extract an x'', y'' value representing a location in the new view, and apparatus for generating the new view on the basis of the result of the plugging in step.

Also provided, in accordance with a preferred embodiment of the present invention, is apparatus for reconstructing a 3D object from at least one and preferably three 2D projections thereof, the apparatus including apparatus for providing at least one and preferably three 2D projections of a 3D object, an array generator operative to generate an array of numbers described by:

$$\alpha_{ijk} = v_i' b_{jk} - v_j'' a_{ik} \ (i, j, k=1, 2, 3),$$

where $a_{ij}$ and $b_{jk}$ are elements of matrices A and B respectively and $v_i'$ and $v_i''$ are elements of vectors v' and v'' respectively, wherein the matrices and vectors together describe camera parameters of three views of the 3D object, an array permutator operative to permute the array into three homography matrices associated with three corresponding planes in 3D space, and a 3D object reconstructor operative to employ the three homography matrices to reconstruct the 3D object.

Further provided, in accordance with a preferred embodiment of the present invention, is visual recognition apparatus including apparatus for providing three perspective views of a 3D object between which a trilinear relationships exists, and apparatus for employing the trilinear relationship between the views in order to perform visual recognition by alignment.

Further in accordance with a preferred embodiment of the present invention, at least one result of performing the above method is employed in order to perform at least one of the following applications: map making from aerial and satellite photographs and coordinate measurements in aerospace and shipyard assembly plants, coordinate measurements of industrial parts (CMM), automated optical based inspection of industrial parts, robotic cell alignment, robotic trajectory identification, 3D robotic feedback, 3D modelling of scenes, 3D modelling of objects, reverse engineering, and 3D digitizing.

Algebraic computation processes useful for recognition are described below with reference to FIGS. 1–5.

BRIEF DESCRIPTION OF THE DRAWINGS AND APPENDICES

The present invention will be understood and appreciated from the following detailed description, taken in conjunction with the drawings in which:

FIGS. 1A and B is an illustration of two graphs comparing the performance of an epipolar intersection method, shown in dotted line, with the performance of a trilinear functions method, shown in dashed line, in the presence of image noise;

FIGS. 2A–C is a pictorial illustration of two model views of a three-dimensional scene as well as a third reprojected view thereof;

FIGS. 3A–B is a pictorial illustration of a reprojection using a trilinear result;

FIGS. 4A–B is a pictorial illustration of a reprojection using intersection of epipolar lines;

FIGS. 5A–C is a pictorial illustration of a reprojection using a linear combination of views method;

Figure 8:
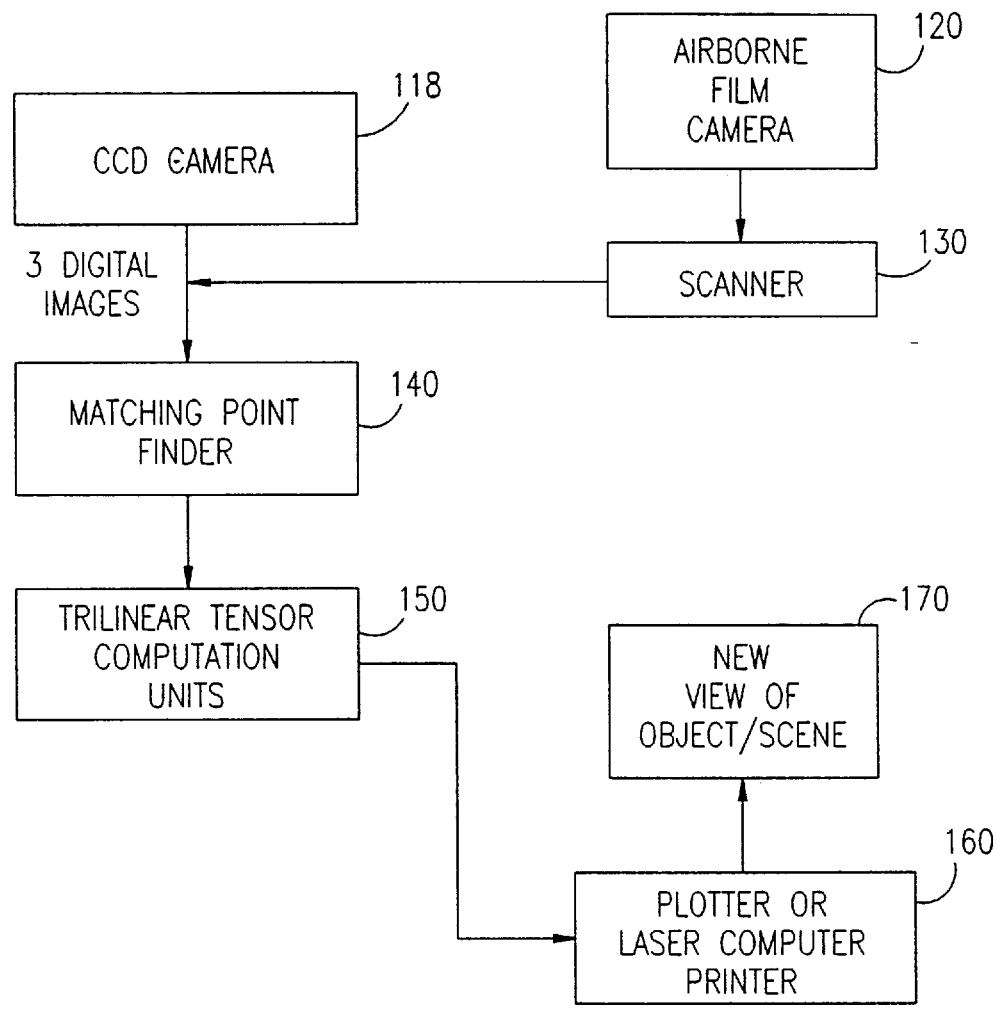
Figure 9:
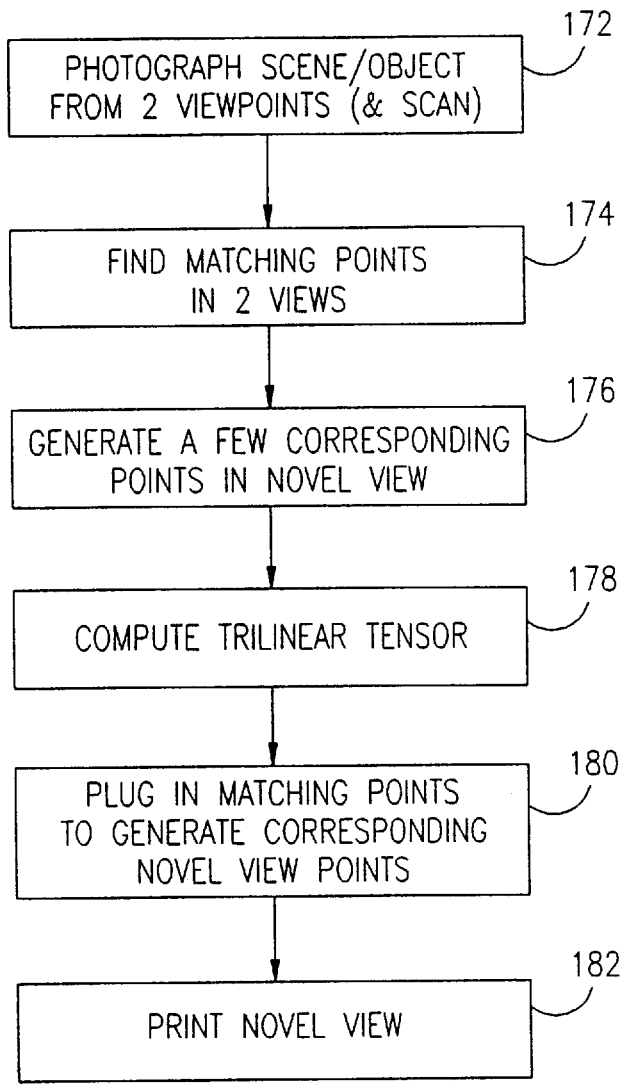
Figure 10:
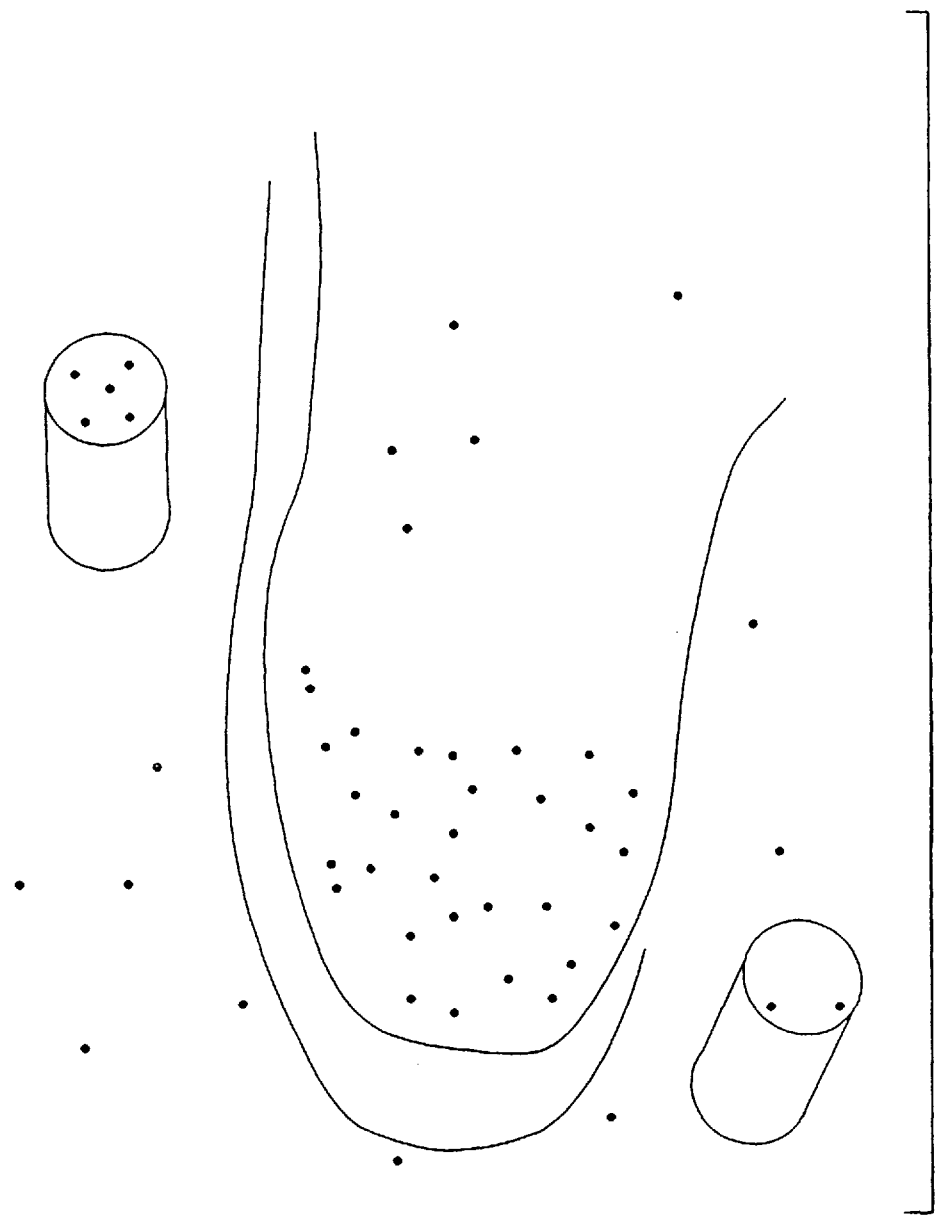
Figure 11:
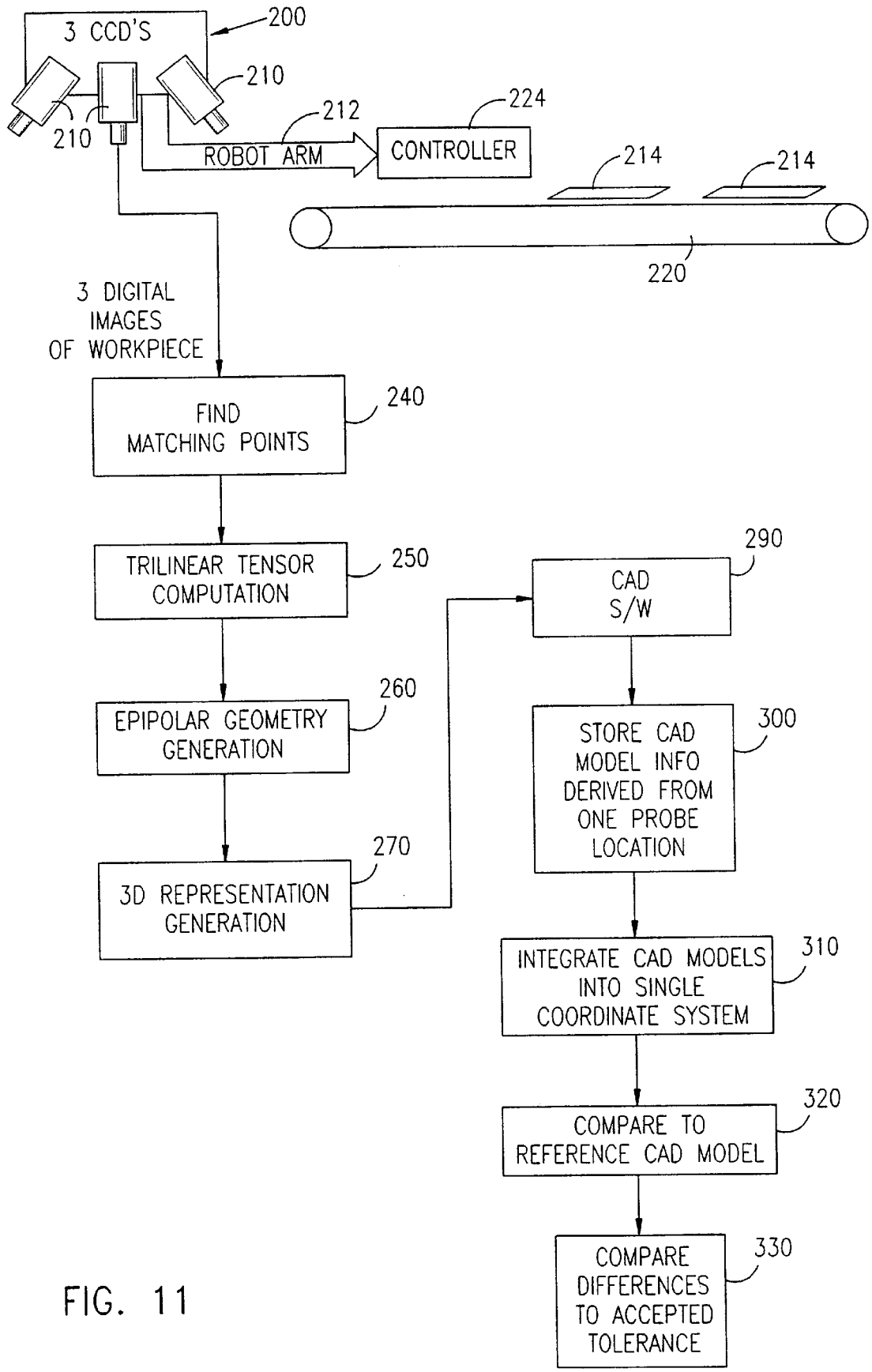
Figure 12:
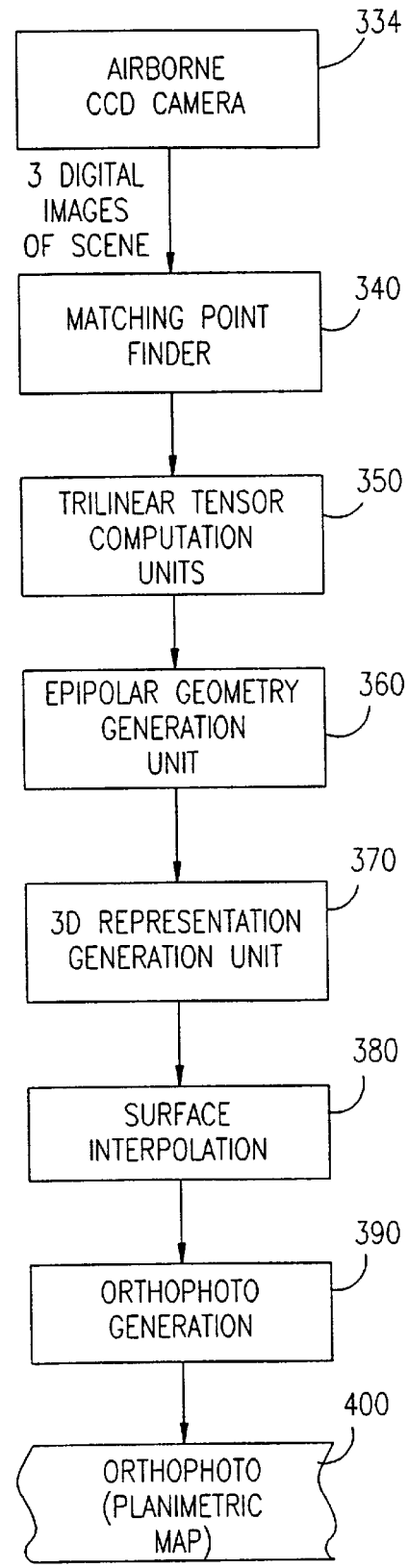

FIG. 8 is a simplified functional block diagram of image transfer apparatus, constructed and operative in accordance with a preferred embodiment of the present invention, which is operative to generate a novel view of a 3D scene from at least two reference views thereof; and FIG. 9 is a simplified flowchart illustration of a preferred image transfer method, operative in accordance with a preferred embodiment of the present invention, which is useful in conjunction with the apparatus of FIG. 8;

FIG. 10 is an illustration of a 3D reconstruction of a shoe which is also illustrated in FIG. 2;

FIG. 11 is a simplified block diagram illustration of a preferred method and apparatus for quality assurance of workpieces; and FIG. 12 is a simplified block diagram illustration of a preferred method and apparatus for generating a digital terrain map.

Figure 6:
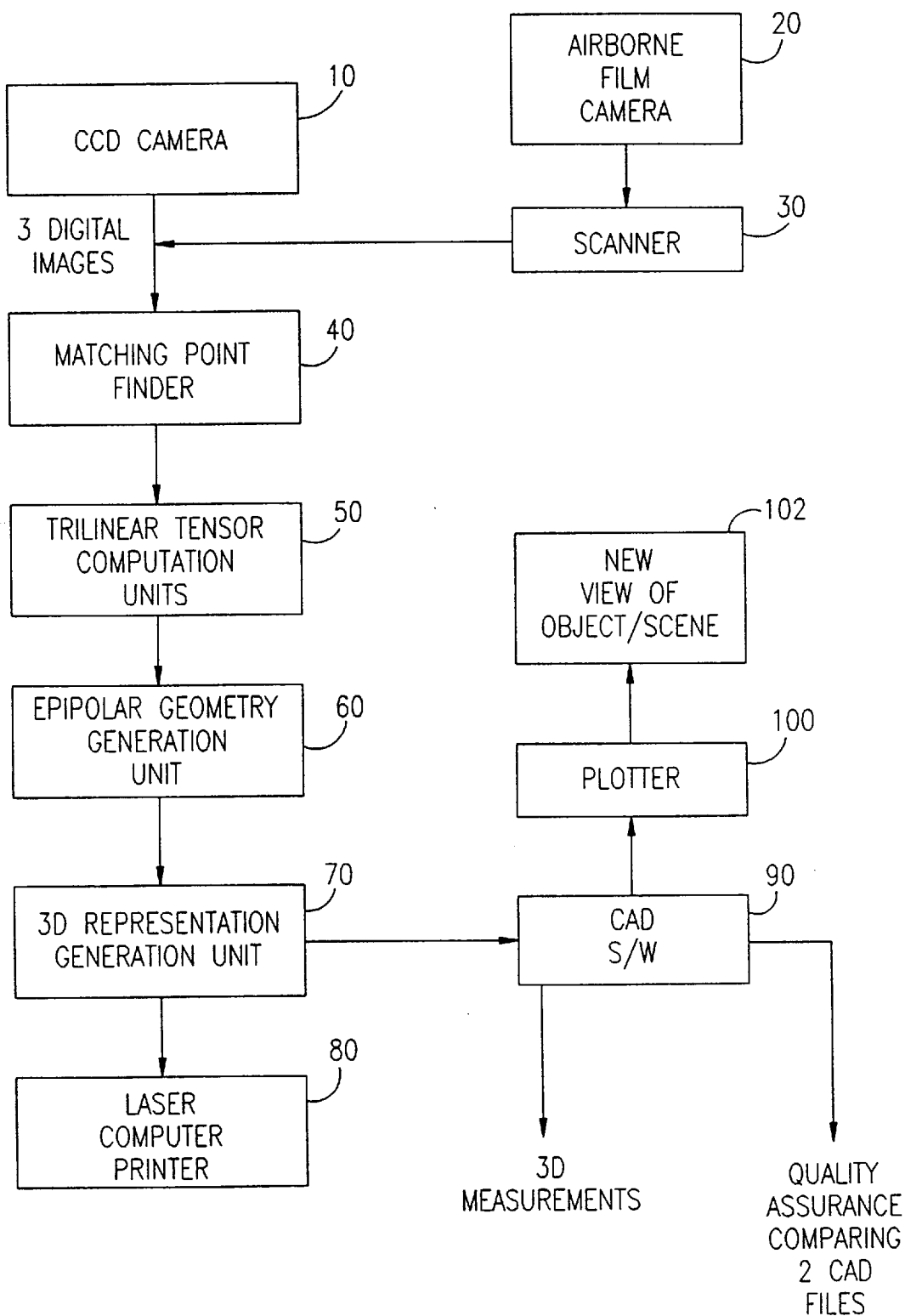
FIG. 6 is a simplified functional block diagram of 3D scene reconstruction apparatus, constructed and operative in accordance with a preferred embodiment of the present invention, which is operative to generate a 3D representation of a 3D scene from at least three views thereof.

This application was filed with appendices A and B as follows:

Appendix A, which is a listing, in "C" language, of a preferred implementation of trilinear computation unit 50 and epipolar geometry generation unit 60 of FIG. 6; and Appendix B, which is a listing of a preferred software implementation of 3D reconstruction apparatus constructed and operative in accordance with a preferred embodiment of the present invention. Reference can be made to the file wrapper for inspection of the appendices.

Detail Description of Preferred Embodiments

A pin-hole camera, like 35 mm still camera or Video recorder, produces a two-dimensional projection (2D) of the viewed three-dimensional (3D) world. The resulting image can be analyzed on a geometric and photometric level. The geometric level means the geometric relation between the locations of features (points, lines) in 3D and their respective location in the 2D image. The photometric level means the radiometric (reflectance properties of the surface, the spectral properties of the light sources illuminating the scene, etc.) relation between the scene and the luminosity (pixel grey values) in the image.

The 3D world is modeled as a cloud of points and so is the 2D world. In other words, we identify point features in the image that correspond to point features in 3D. There is a geometric relation between the two sets of points. When the camera moves in 3D we get more images of the same 3D world (i.e., of the same cloud of 3D points) and the question of interest is the geometrical relation between the corresponding set of 2D image points and the set of 3D points. In other words, if $P_i$ denotes a set of 3D points, and $p_i$, $p'_i$, $p''_i$ are three sets of 2D points (across three images) arranged such that points with same index i correspond to the same 3D point $P_i$, then the image sets alone reveal much information about the 3D set.

There are two questions of interest: (i) what is necessary to measure in the 2D images (how many points across how many images) in order to recover the location of the 3D points (reconstruction), (ii) given the image correspondences can we synthesize new views (the problem of image transfer) without explicitly reconstructing the object. The system and method in accordance with the invention deals with both questions.

The general material of 3D-from-2D is an active area in Computer Vision (structure-from-motion and stereopsis), and is the sole engine in the industry of photogrammetry (map making from areal and satellite photographs, coordinate measurements in aerospace and shipyard assenmbly plants, etc.).

The relationship between 3D points and 2D points can be represented as a 3×4 transformation matrix:

$$p \cong MP,$$

where $p=(x, y, 1)^T$ represents the 2D point in homogeneous coordinates (i.e., the image plane is the 2D projective plane), where x, y are the horizontal and vertical components of the point's location in the image (with respect to some arbitrary origin—say the geometric center of the image plane); P is represented by a 4-vector, which means that we view the object space as embedded in the three-dimensionial projective space. The matrix M is 3×4 and represents the camera parameters (for example, the vector Q defined by MQ=0 is the camera's center of projection—the point where all the optical rays converge to). The sign $\cong$ denotes equality up to scale.

Because we are embedding the image and the object into projective spaces (which means that the world can undergo rigid motion and be stretched and sheared) we can transform the object space such that the camera transformation associated with the first view is [I,0], where I is the identity matrix. For three views we have:

$$p = [I,0]P$$
$$p' \cong [A,v']P$$
$$p'' \cong [B,v'']P$$

where $P=(x, y, 1, k)^T$, and the image points are $p=(x, y, 1)^T$, $p'=(x', y', 1)^T$ and $p''=(x'', y'', 1)^T$. Note: what we measure in the images are the locations of p, p', p'', the location of P (i.e., the value of k) is not known. A and B are some 3×3 matrices (not independent of each other) and v', v'' are some 3-vectors together describing the camera parameters of the three views. Note: the camera parameters A, B, v', v'' are unknown. In other words, given three views with corresponding points $p_i$, $p'_i$, $p''_i$, i=1, . . . , n, there exists a set of numbers $k_i$ and parameters A, B, v', v'' such that the equations above hold for all i.

I. TRILINEAR TENSOR

The array of 27 numbers described by:

$$\alpha_{ijk} = v'_i b_{jk} - v''_j a_{ik}, \ i, j, k=1, 2, 3$$

where $a_{rs}$, $b_{rs}$ are the elements of A, B, and $v'_r$, $v''_r$ are the elements of v', v", is referred to as the "triliiear tensor". These numbers are invariant to the particular projective representation of the 3D and 2D worlds, i.e., they are intrinsic to the three views (this is one of the general properties of tensors that they do not depend on the choice of basis for representation).

NOTE: the array $\alpha_{ijk}$ provides the foundation for numerous applications. A preferred method for producing the array from image measurements p, p', p" will be described next.

A. recovering $\alpha_{ijk}$ from image measurements

A corresponding triplet p, p', p" satisfies a number of trilinear relationships. First notation: We identify vectors and matrices by fixing some of the indices while varying others. For example, $\alpha_{ijk}$ is a set of scalars, $\alpha_{ij.}$ is a set of 9 vectors (k varies while i,j remain fixed); $\alpha_{i..}$ is a set of 3 matrices ($\alpha_1 \ldots, \alpha_2 \ldots$ and $\alpha_3 \ldots$), and so forth.

For a given order (i.e., we do not permute the views), there are 9 trilinear functions, that come in sets of 4 linearly independent forms. The coefficients of these forms are elements of the array $\alpha_{ijk}$. For example, the following four forms are linearly independent invariant functions of three views:

$$x''\alpha_{13.}{}^T p - x''x'\alpha_{33.}{}^T p + x'\alpha_{31.}{}^T p - \alpha_{11.}{}^T p = 0,$$

$$y''\alpha_{13.}{}^T p - y''x'\alpha_{33.}{}^T p + x'\alpha_{32.}{}^T p - \alpha_{12.}{}^T p = 0,$$

$$x''\alpha_{23.}{}^T p - x''y'\alpha_{33.}{}^T p + y'\alpha_{31.}{}^T p - \alpha_{21.}{}^T p = 0,$$

$$y''\alpha_{23.}{}^T p - y''y'\alpha_{33.}{}^T p + y'\alpha_{32.}{}^T p - \alpha_{22.}{}^T p = 0.$$

The remaining functions are described in equations 7–11 presented herein.

Since every corresponding triplet p, p', p" contributes four linearly independent equations, then seven corresponding points across the three views uniquely determine (up to scale) the tensor $\alpha_{ijk}$.

NOTE 1: what this means is that if we identify 7 triplets of corresponding points across the three views—say the object is a human face and we track the corner of the nose across three views: its location in the first view will be denoted by (x, y), the location of the nose in the second view will be denoted by (x', y') and the location of the nose in the third view is (x", y")—then each such triplet provides 4 linearly independent equations for the 27 parameters we seek to recover. Thus, we obtain 28 equations which is more than sufficient to solve for $\alpha_{ijk}$.

NOTE 2: There are many ways to solve for linear systems, especially when more equations than unknowns are provided (i.e., when more than 7 corresponding triplets are given), for example least-squares technique, and robust methods for removing outliers within leasts-squares techniques.

II. RANK 4 CONSTRAINT: TENSORIAL CONNECTIONS ACROSS MORE THAN 3 VIEWS

Given a set of m>3 views, the various trilinear tensors of subsets of 3 views out of entire set of views are not independent, and in fact are linearly related to each other. This relation, described below, we call "the rank 4 constraint".

We arrange a tensor of three views a tensor in a 9×3 matrix denoted by G, where column j=1, 2, 3 contains the elements $\alpha_{1,j,1}, \alpha_{1,j,2}, \ldots, \alpha_{3,j,3}$.

Let the arbitrary set of m views be arranged as $\psi_1, \psi_2, \psi_j$, j=3, ..., m. Consider the m−2 tensors of views $<\psi_1, \psi_2, \psi_j>$ and let the correspondence G matrices be denoted by $G_j$. Then the concatenation of the $G_j$ matrices into a 9×3(m−2) matrix has rank 4 regardless of m (in general, if the $G_j$ matrices were independent, the rank of the concatenation would have been the smaller dimension, i.e., 9 when m≧5).

The rank-4-constraint implies that the four largest principal components of the concatenation matrix represents the geometry between views $\psi_1$ and $\psi_2$, in a way that is statically optimal.

A. Application 1: Image Transfer

Say we have two views with corresponding points $p_i$, $p'_i$, i=1, ..., n. We wish to create a new view of the same object. Given the tensor $\alpha_{ijk}$ we plug into the trilinear forms the values of $p_i$, $p'_i$ and extract the value of x", y", regardless of the manner in which $\alpha_{ijk}$ is obtained.

The tensor $\alpha_{ijk}$ can be obtained, for example, if we know the locations of $p''_i$ for 7 points, e.g., i=1, ..., 7. Then for every 8th point we can recover p" from the pair p, p' and the tensor.

B. Application 2: Reconstruction

A tensor of three views, or the four largest principle components of the concatenation matrix of m>3 views (see Section II) can be used to recover the epipolar geometry between two views, and from there to be used for reconstructing a 3D model of the scene.

Let $E_j = \alpha_{.j.}$ be three 3×3 matrices, i.e., $E_j = \alpha_{1, j, 1}, \alpha_{1, j, 2}, \ldots, \alpha_{3, j, 3}$. Then this particular permutation of the array of 27 numbers into three matrices yields the following result:

The three matrices $E_1$, $E_2$, $E_3$ are projective transformations (homography matrices) associated with some three planes in 3D space.

What this means is that there exists three planes $\pi_j$ in space, such that if P is coplanar with $\pi_1$ (for example) and p, p' are the image locations in the first two views, then $E_1 p \cong p'$. Similarly for j=2, 3.

The "fundamental matrix" F (or "coplanarity constraint" as used in photogrammetrical literature) between the first two views satisfies:

$$E_j^T F + F^T E_j = 0 \quad j=1, 2, 3$$

a relation that provides a linear system of equations for solving for F.

Similarly, the four largest principle components of the concatenation matrix (Section II) for m>3 views can be used to solve for F, as follows. Let $A_k$, k=1, ..., 4 be the four largest principal components of the concatenation matrix, each arranged in a 3×3 matrix (row-wise). Then, $$A_k^T F + F^T A_k = 0 \quad k=1, 2, 3, 4$$

which provides a statically optimal way to linearly recover F from m>3 views.

The "epipolar" point v' can be recovered, either by the relation $F^T v' = 0$, or directly from the tensor as follows:

The cross-product of corresponding columns of each two of the matrices out of the three matrices $E_1$, $E_2$, $E_3$ provides an epipolar line, i.e., a line that is coincident with v'. Similarly, if we denote by $a_1$, $a_2$, $a_3$ the columns of one E matrix, and by $b_1$, $b_2$, $b_3$ the columns of another E matrix, then $$a_i \times b_j - b_i \times a_j$$

is an epipolar line for i≠j. Taken together the tensor gives rise to 18 epipolar lines whose intersection defines the epipole v'. The point of intersection could be found by, for example, a least-squares method.

Similarly, the epipolar point v' can be recovered from $A_1, \ldots, A_4$, the four largest principal components concatenation matrix, as follows. Let $a_1, a_2, a_3$ be the the columns of matrix $A_1$, and by $b_1, b_2, b_3$ the columns of $A_2$, then $$a_i \times b_j - b_i \times a_j$$

is an epipolar line for $i \neq j$, and $$a_i \times b_i$$

provides another set of three epipolar lines. By selecting in this way two out of the four matrices $A_1, \ldots, A_4$ we get 24 epipolar lines which provide a redundant set of equations for solving for v'.

The projective model of the 3D scene follows from F and v', for example: the 3×4 matrix $[[v']F,v']$ is a camera transformation from 3D coordinates to the image coordinates of the second view. In other words, for every matching pair p, p' of points in first and second view, respectively, we have:

$$p' \cong [v']Fp+kv',$$

thus the coordinate vector [x, y, 1, k] provides a 3D (projective) model of scene.

NOTE 1: the permutation $\alpha_i \ldots$ yields also three homography matrices $W_1, W_2, W_3$ of three other planes. The homography matrices are from first to third view, i.e., $W_1 p \cong p''$ for p, p'' coming from P coplanar with the plane associated with $W_1$. Thus, analogous to the use of the matrices $E_1, E_2, E_3$, we can recover the fundamental matrix F'' and epipolar point v'' associated with the epipolar geometry between the first and third view.

ACHIEVING IMAGE CORRESPONDENCECS ACROSS 3 VIEWS

One of the important steps in manipulating 3D scenes from 2D imagery is the step of obtaining a reliable set (as dense as possible) of matching points across the views at hand. The current state-of-the-art use correlation techniques across the image intensities of two views together with geometric information, such as the epipolar geometry.

With the tensor one can extend the correspondence method to take advantage of three views together and without assuming camera calibration. Given an initial set of corresponding points across three views one recovers the trilinear tensor. Then, the triliniear tensor provides a constraint for using correlation methods to accurately locate the matching points. This can be done as follows.

Let $E_1, E_2, E_3$ denote the arrangement $\alpha_{\cdot ij}$ of the tensor and $W_1, W_2, W_3$ denote the arrangement $\alpha_i \ldots$ of the tensor. We first align all three images such that the displacements between matching points become only along epipolar lines. This is done as follows.

Let $E = \Sigma_j \rho_j E_j$ where the coefficients $\rho_j$ are the solution of the linear least-squares condition $Ep_k \cong p'_k$ for all initial matching points $p_k$, $p'_k$ in first and second image, respectively. Similarly, let $W = \Sigma_i \mu_i W_i$ where the coefficients $\mu_i$ are the solution of the linear least-squares condition $Wp_k \cong p''_k$ for all initial matching points $p_k$, $p''_k$ in first and third image, respectively. The process of "warping" image two with the transformation $E^{-1}$ and image three with the transformation $W^{-1}$ produces two new images denote by 2' and 3', such that the matching points across images 1, 2' are along epipolar lines and the matching points across images 1, 3' are along epipolar lines.

The epipolar lines can be derived from the tensor as presented herein (Section II.B in detailed description of preferred embodiment). Let w' and w'' be the direction vectors of the epipolar lines between 1, 2' and 1, 3', respectively. Hence, if p=(x, y), p'=(x', y'), p''=(x'', y'') are matching points in images 1, 2', 3' respectively, then $p' = p + \alpha w'$ and $p'' = p + \beta w''$ for some coefficients $\alpha, \beta$. Note that w', w'', $\alpha, \beta$, are quantities that change with the location (x, y).

The trilinear equations, (3)–(6) presented herein, provide a geometric constraint on the coefficients $\alpha, \beta$, i.e., for each arbitrary value of $\alpha$, the value of $\beta$ is then uniquely determined. and vice versa. In order to recover both $\alpha, \beta$ we use the image intensities of 1, 2', 3' as follows.

The coeffients $\alpha, \beta$ satisfy the "constant brightness equation":

$$\alpha(I_x, I_y)^T w' + I_t^{12'} = 0$$

$$\beta(I_x, I_y)^T w'' + I_t^{13'} = 0$$

where $(I_x, I_y)$ is the gradient vector at location p=(x, y) in the first image, and $I_t^{12'}$ is the temporal derivative between images 1, 2', and $I_t^{13'}$ is the temporal derivative between images 1, 3' (all derivatives are discrete approximations). From the trilinear equations, (3)–(6) presented herein, we can obtain $f(\alpha, \beta) = 0$ where the coefficients of the function $f()$ are elements of the tensor. Thus one obtains a least-squares solution for $\alpha$ and $\beta$ that satisfies both geometric an photometric constraints.

The entire procedure can be done hierarchically along a Laplacian Pyramid as described in "J. R. Bergen and R. Hingorani, Hierarchical motion-based frame rate conversion"; Technical report, David Sarnoff Research Center, 1990.

Reference is now made to FIG. 6 which is a simplified functional block diagram of 3D scene reconstruction apparatus, constructed and operative in accordance with a preferred embodiment of the present invention, which is operative to generate a 3D representation of a 3D scene from at least three views thereof.

The apparatus of FIG. 6 includes apparatus for providing at least 3 digital images of a 3D scene or object from at least 3 respective viewpoints, such as a CCD camera 10 which operates from 3 different viewpoints, or such as a film camera 20, which may be airborne, associated with a scanner 30 (such as a Zeiss PS-1 which is operative to digitize the images generated by film camera 20.

The at least 3 digital views are fed to a matching point finder 40 which is operative to identify at least 7 and preferably a multiplicity of triplets of matching points from the 3 digital views. "Matching points" from different views are points or locations which correspond to a single location in the real, 3D world. These points may, for example, be identified manually. For aerial photographs, commercially available matching point software may be employed such as the Match-T package marketed by Inpho in Stuttgart, which performs a correspondence function.

Conventional methods for finding matching points are described in Wang, H. and Brady, J. M., "Corner detection: some new results", IEEE colloquium Digest of Systems Aspects of Machine Perception and vision", London 1992, pp. 1.1–1.4.

A trilinear tensor computation unit 50 receives the matching point triplets and computes a trilinear tensor representing the geometric relationship between the three views.

The trilinear tensor is then employed to generate a 3D representation of a 3D scene. According to one embodiment of the present invention, the trilinear tensor is employed by an epipolar geometry generation unit 60 to compute an epipolar geometric representation of two of the three views.

Subsequently, 3D representation generation unit 70 generates the 3D representation of the scene or object from the epipolar geometric representation output of unit 60, as described in more detail in:

a. Faugeras, O. D. "What can be seen in 3 dimensions with an uncalibrated stereo rig?", Proceedings of the European Conference on Computer Vision, pages 563–578, Santa Margherita Ligure, Italy, June 1992.

b. Hartley, R. et al, "Stereo from uncalibrated cameras." Proceedings IEEE Conf. on Computer Vision and Pattern Recognition, 761–764, Champaign, Ill., June 1992.

c. Shashua, A. "Projective structure from uncalibrated images: structure from motion and recognition. IEEE Transactions on PAMI, 16(8): 778–790, 1994.

A preferred implementation of units 50 and 60 is described, in "C" computer language form, in Appendix A. A preferred implementation of unit 50 is described from page 1 of Appendix A until toward the end of page 4 thereof. A preferred implementation of unit 60 is described from the end of page 4 of Appendix A until the middle of page 8. Subroutines and statistical procedures which are useful in understanding the above material appear from page 8 of Appendix A onward.

The 3D representation, including 3D information representating at least a portion or an aspect of the 3D scene or object, may be employed by a laser computer printer to generate a new view of the object or scene. Alternatively, conventional CAD (computer aided design) software in conjunction with a conventional plotter may be employed to generate a new view of the object or scene. The CAD software may also be operative to compare 2 CAD files in quality assurance applications.

Figure 7:
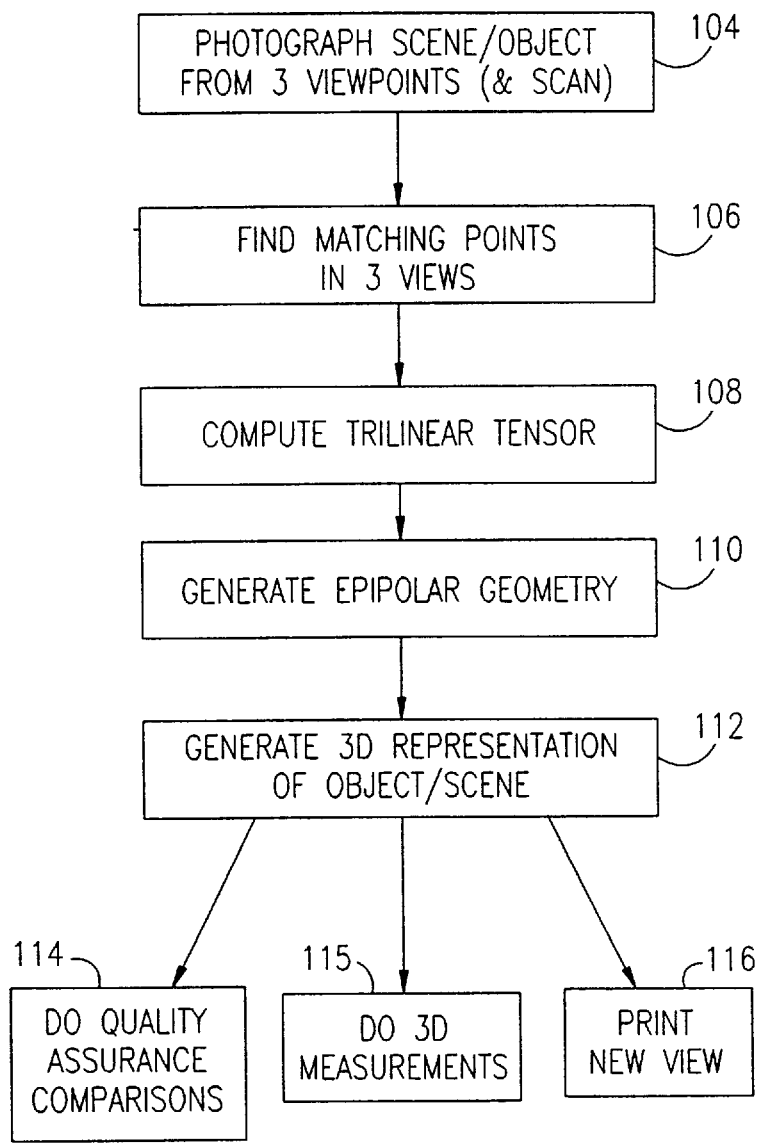
FIG. 7 is a simplified flowchart illustration of a preferred 3D scene reconstruction method, operative in accordance with a preferred embodiment of the present invention, which is useful in conjunction with the apparatus of FIG. 6.

Reference is now made of FIG. 7 which is a simplified flowchart illustration of a preferred 3D scene reconstruction method, operative in accordance with a preferred embodiment of the present invention, which is useful in conjunction with the apparatus of FIG. 6. FIG. 7 is generally self-explanatory. The 3 views of the scene or object can be digital, if they are accessed from a digital archive or generated, e.g. by a digital camera. If they are not digital, they are scanned or otherwise digitized.

Any suitable conventional or other formats may be employed. For example, the Silicon Graphics's Inventor format may initially be employed for the 3D representation. The Inventor format may be converted into Postscript in order to print a new view of the 3D representation.

As shown, the 3D representation of the scene is useful in performing a wide range of activities such as 3D measurements of the scene or object, generation, e.g. as a printout, of a new view of the scene or object, and quality assurance comparisons in which the generated 3D representation of the object or scene is compared to a desired object or scene or a desired 3D representation thereof, using conventional methods.

Reference is now made to FIG. 8 which is a simplified functional block diagram of image transfer apparatus, constructed and operative in accordance with a preferred embodiment of the present invention, which is operative to generate a novel view of a 3D scene from at least two reference views thereof. The apparatus of FIG. 8 is similar to the apparatus of FIG. 6. However, in FIG. 8, a novel view of a 3D scene is directly generated from only at least two reference views thereof, preferably without generating a 3D representation intermediate.

In FIG. 8, geometric information regarding the two reference views and the desired novel view is employed to generate a trilinear tensor representing the geometric relationship between the three views. Typically, at least 7 triplets of locations in the novel view may be identified, e.g. manually, which correspond to 7 locations respectively in each of the at least two reference views. Typically, at least some information regarding the novel view is available. For example, if it is desired to update a GIS (geographic information system) year-old view, based on at least two new reference views of the same area it is typically possible to identify at least 7 locations in the year-old view which correspond to 7 locations in the two reference views and which can be assumed will still exist in the soon-to-be-generated current version of the year-old view.

The novel view is typically generated by computing a multiplicity of novel view locations each corresponding to different first and second corresponding locations in said first and second reference views respectively based on said first and second corresponding locations and said trilinear tensor. For example, the matching point finder 140 may generate a multiplicity of pairs of matching points from the two reference views, say 1000 such pairs. For the first 7 pairs, a user may manually indicate 7 matching points in the novel view.

Once the trilinear tensor is generated by trilinear tensor computation unit 150, the coordinates of Matching Point Pairs 8-1000 may be plugged into the trilinear tensor, as shown in FIG. 9, in order to generate coordinates of matching points 8-1000 in the novel view.

The novel view thus generated may, for example, be compared to the same view as seen a year before, in order to identify differences in the scene which took place in the course of the year.

Reference is now made to FIG. 9 which is a simplified flowchart illustration of a preferred image transfer method, operative in accordance with a preferred embodiment of the present invention, which is useful in conjunction with the apparatus of FIG. 8. FIG. 9 is generally self-explanatory.

In any of the embodiments described herein, if more than 3 views are provided, "intermediate" tensors may be computed for each 3 views. Then, a representative tensor may be computed based on the relationships between these "intermediate" tensors.

FIG. 10 is an illustration of a 3D reconstruction of a shoe which is also illustrated in FIG. 2. FIG. 10 was generated by finding matching points and reconstructing their 3D locations. Next the coordinates are processed by CAD software to generate the surface shown in FIG. 10.

FIG. 11 is a simplified block diagram illustration of a preferred method and apparatus for quality assurance of workpieces. FIG. 11 includes an array 200 of 3 CCD cameras 210 which are aimed at a single location, so as to yield three perspectives of that location. The CCD cameras are attached to a robot arm 212 and therefore can move relative to a workpiece 214 arriving along a conveyor belt 220 in accordance with suitable instructions from a controller 224.

When a workpiece enters the field of view of the CCD cameras 210, the conveyor belt 220 typically pauses to allow substantially the entirety of the surface area of the workpiece to be imaged by the cameras 210. The controller 224, via robot arm 212, moves the camera array 200 around the object such that, typically, almost its entire surface area is imaged. For example, the camera array 200 may be moved through 10 different positions around the object, and at each position, each of the 3 CCD cameras images the workpiece. The number of positions employed depends on the complexity of the workpiece.

This process yields a plurality of image triplets, each image triplet including three digital images of the same portion of the workpiece, from 3 respective perspectives. For each image triplet, the corresponding position of the array 200 and of each of the cameras 210 may be computed, based on the robot arm's location, which is known, and using hand-eye calibration.

Each image triplet is processed by units 240, 250, 260, 270 and 290 which may be similar to units 40, 50, 60, 70 and 90, respectively, of FIG. 6.

The CAD model information generated by CAD S/W 290 from each image triplet (each probe location) is stored in a suitable memory 300. A computation unit 310 is operative to integrate the multiplicity of probe locations corresponding to the multiplicity of positions of CCD camera array 200, into a single coordinate system. The necessary coordinate transformations are computed by inverting the transformations which define the CCD camera array's motion.

A computational unit 320 compares the output of unit 310 to a reference CAD model and computes differences therebetween. These differences are compared, in a computational unit 330, to accepted tolerances.

The apparatus of FIG. 11 is also suitable for 3D digitization applications for reverse engineering or CAD (computer aided design purposes).

FIG. 12 is a simplified block diagram illustration of a preferred method and apparatus for generating a digital terrain map, e.g. in order to update municipal maps, to detect illegal structures, to serve a car navigation system, or even to map a microscopic object such as an integrated circuit.

An airborne CCD camera 334 is flown over a scene for which it is desired to generate a digital terrain map. The camera 334 generates 3 digital images of the scene from 3 respective perspectives. The 3 images are processed by units 340, 350, 360 and 370 which may be similar to units 40, 50, 60 and 70 of FIG. 6.

A surface interpolation procedure is performed by a surface interpolation unit 380, on the output of 3D representation generation unit 370. A suitable surface interpolation method is described in Grimson, W. E. L, "A computational theory of visual surface interpolation", Proc. of the Royal Soc. of London B, 298, pp. 395–427, 1982.

Finally, perspective distortions are removed from the output of surface interpolation unit 380 by an orthophoto generation unit 390, resulting in an orthophoto (planimetric map). A suitable method of operation for unit 390 is described in Slama, C. C., "Manual of Photogrammetry", American Society of Photogrammetry, 1980.

The present invention is also useful for visualization of a 3D object, particularly for entertainment, animation or educational applications. A camera array such as array 200 of FIG. 11 circles around an object to be visualized and images substantially the entire surface area which it is desired to display to a user. For example, the camera array may image the object from each of 200 positions surrounding the object.

Synthetic images may then be generated for positions other than the 200 above-mentioned positions. A desired position may be indicated by a user, e.g. by means of a joystick. The apparatus of the present invention may be used to generate a synthetic image for that position.

Conventional driving simulation games employ synthetic backgrounds, however, the present invention may be employed to provide a driving simulation game with a real background. To do this, an array of at least 3, and preferably 5–10 cameras is moved within a desired scene such that substantially the entirety of the scenes can be captured by the camera array from at least 3 and preferably more different perspectives. For example, the scene may be captured from each of approximately 1000 positions of the camera array. New views are then generated, in accordance with the present invention, in order to accomodate a user's need for new views as indicated, e.g. by a joystick.

Algebraic functions useful for recognition are now described, based on an article entitled "Algebraic functions for recognition", to be published in IEEE, Transactions on PAMI.

Algebraic Functions For Recognition

I. INTRODUCTION

We establish a general result about algebraic connections across three perspective views of a 3D scene and denmonstrate its application to visual recognition via alignment. We show that, in general, any three perspective views of a scene satisfy a pair of trilinear functions of image coordinates. In the limiting case when all three views are orthographic, these functions become linear and reduce to the form discovered by S. Ullman and R. Basri, "Recognition by linear combination of models" (IEEE Transactions On Pattern Analysis and Machine Intelligence, PAMI-13:992–1006, 1991; also in MIT AI Memo 1052, 1989) (hereinafter "Ullman and Basari"). Using the trilinear result one can manipulate views of an object (such as generate novel views from two model views) without recovering scene structure (metric or non-metric), camera transformation, or even the epipolar geometry. Moreover, the trilinear functions can be recovered by linear methods with a minimal configuration of seven points. The latter is shown to be new lower bound on the minimal configuration that is required for a general linear solution to the problem of re-projecting a 3D scene onto an arbitrary novel view given corresponding points across two reference views. Previous solutions rely on recovering the epipolar geometry which, in turn, requires a minimal configuration of eight points for a linear solution.

The central results are contained in Theorems 1,2 and 3. The first theorem states that the variety of views $\psi$ of a fixed 3D object obtained by an uncalibrated pin-hole camera satisfy a relation of the sort $F(\psi, \psi_1, \psi_2)=0$, where $\psi_1, \psi_2$ are two arbitrary views of the object, and F has a special trilinear form. The coefficients of F can be recovered linearly without establishing first the epipolar geometry, 3D structure of the object, or camera motion. The auxiliary Lemmas required for the proof of Theorem 1 may be of interest on their own as they establish certain regularities across projective transformations of the plane and introduce new view invariants (Lemma 4).

Theorem 2 addresses the problem of recovering the coefficients of the trilinear functions in the most economical way. It is shown that among all possible trilinear functions across three views, there exists at most four linearly independent such functions. As a consequence, the coefficients of these functions can be recovered linearly from seven corresponding points across three views.

Theorem 3 is an obvious corollary of Theorem 1 but contains a significant practical aspect. It is shown that if the views $\psi_1, \psi_2$ are obtained by parallel projection, then F reduces to a special bilinear form—or, equivalently, that any perspective view $\psi$ can be obtained by a rational linear function of two orthographic views. The reduction to a bilinear form implies that simpler recognition schemes are possible if the two reference views (model views) stored in memory are orthographic.

These results may have several applications (discussed in Section VI), but the one emphasized throughout this manuscript is for the task of recognition of 3D objects via alignment. The alignment approach for recognition is based on the result that the equivalence class of views of an object (ignoring self occlusions) undergoing 3D rigid, affine or projective transformations can be captured by storing a 3D model of the object, or simply by storing at least two arbitrary "model" views of the object—assuming that the correspondence problem between the model views can somehow be solved. During recognition a small number of corresponding points between the novel input view and the model views of a particular candidate object are sufficient to "re-project" the model onto the novel viewing position. Recognition is achieved if the re-projected image is successfully matched against the input image. We refer to the problem of predicting a novel view from a set of model views using a limited number of corresponding points, as the problem of re-projection.

The problem of re-projection can in principal be dealt with via 3D reconstruction of shape and camera motion. This includes classical structure from motion methods for recovering rigid camera motion parameters and metric shape, and more recent methods for recovering non-metric structure i.e., assuming the objects undergo 3D affine or projective transformations, or equivalently, that the cameras are uncalibrated. The classic approaches for perspective views are known to be unstable under errors in image measurements, narrow field of view, and internal camera calibration, and therefore, are unlikely to be of practical use for purposes of re-projection. The non-metric approaches, as a general concept, have not been fully tested on real images, but the methods proposed so far rely on recovering first the epipolar geometry—a process that is also known to be unstable in the presence of noise.

It is also known that the epipolar geometry alone is sufficient to achieve re-projection by means of intersecting epipolar lines using at least eight corresponding points across the three views. This, however, is possible only if the centers of the three cameras are non-collinear—which call lead to numerical instability unless the centers are far from collinear—and any object point on the tri-focal plane cannot be re-projected as well. Furthermore, as with the non-metric reconstruction methods, obtaining the epipolar geometry is at best a sensitive process even when dozens of corresponding points are used and with the state of the art methods (see Section V for more details and comparative analysis with simulated and real images).

For purposes of stability, therefore, it is worthwhile exploring more direct tools for achieving re-projection. For instance, instead of reconstruction of shape and invariants we would like to establish a direct connection between views expressed as a functions of image coordinates alone— which we call "algebraic functions of views". Such a result was established in the orthographic case by Ullman and Basri. There it was shown that any three orthographic views of an object satisfy a linear function of the corresponding image coordinates—this we will show here is simply a limiting case of larger set of algebraic functions, that in general have a trilinear form. With these functions one can manipulate views of an object, such as create new views, without the need to recover shape or camera geometry as an intermediate step—all what is needed is to appropriately combine the image coordinates of two reference views. Also, with these functions, the epipolar geometries are intertwined, leading not only to absence of singularities and a lower bound on the minimal configuration of points, but as we shall see in the experimental section to more accurate performance in the presence of errors in image measurements.

II. NOTATIONS

We consider object space to be the three-dimensional projective space $P^3$, and image space to be the two-dimensional projective space $P^2$. Let $\Phi \subset P^3$ be a set of points standing for a 3D object, and let $\psi_i \subset P^2$ denote views (arbitrary), indexed by i, of $\Phi$. Given two cameras with centers located at O,O' $\in P^3$, respectively, the epipoles are defined to be at the intersection of the line $\overline{OO'}$ with both image planes. Because the image plane is finite, we can assign, without loss of generality, the value 1 as the third homogeneous coordinate to every observed image point. That is, if (x, y) are the observed image coordinates of some point (with respect to some arbitrary origin—say the geometric center of the image), then p=(x, y, 1) denotes the homogeneous coordinates of the image plane. Note that this convention ignores special views in which a point in $\Phi$ is at infinity in those views—these singular cases are not modeled here.

Since we will be working at most three views at a time, we denote the relevant epipoles as follows: let v $\in \psi_1$ and v' $\in \psi_2$ be the corresponding epipoles between views $\psi_1$, $\psi_2$, and let $\overline{v} \in \psi_1$ and v" $\in \psi_3$ the corresponding epipoles between views $\psi_1$, $\psi_3$. Likewise, corresponding image points across three views will be denoted by p=(x, y, 1), p'=(x', y', 1) and p"=(x", y", 1). The term "image coordinates" will denote the non-homogeneous coordinate representation of $P^2$, e.g., (x, y), (x', y'), (x", y") for the three corresponding points.

Planes will be denoted by $\pi_i$, indexed by i, and just $\pi$ if only one plane is discussed. All planes are assumed to be arbitrary and distinct from one another. The symbol $\cong$ denotes equality up to a scale, $GL_n$ stands for the group of n×n matrices, and $PGL_n$ is the group defined up to a scale.

III. THE TRILINEAR FORM

The central results of this manuscript are presented in the following two theorems. The remaining of the section is devoted to the proof of this result and its implications.

Theorem 1 (Trilinearity)

Let $\psi_1$, $\psi_2$, $\psi_3$ be three arbitrary perspective views of some object, modeled by a set of points in 3D. The image coordinates (x, y) $\in \psi_1$, (x', y') $\in \psi_2$ and (x", y") $\in \psi_3$ of three corresponding points across three views satisfy a pair of trilinear equations of the following form:

$$x''(\alpha_1 x+\alpha_2 y+\alpha_3)+x''x'(\alpha_4 x+\alpha_5 y+\alpha_6)+x'(\alpha_7 x+\alpha_8 y+\alpha_9)+\alpha_{10}x+\alpha_{11}y+\alpha_{12}=0,$$

and $$y''(\beta_1 x+\beta_2 y+\beta_3)+y''x'(\beta_4 x+\beta_5 y+\beta_6)+x'(\beta_7 x+\beta_8 y+\beta_9)+\beta_{10}x+\beta_{11}y+\beta_{12}=0,$$

where the coefficients $\alpha_j$, $\beta_j$, j=1, ..., 12, are fixed for all points, are uniquely defined up to an overall scale, and $\alpha_j=\beta_j$, j=1, ..., 6.

The following auxiliary propositions are used as part of the proof.

Lemma 1 (Auxiliary—Existence)

Let A $\in PGL_3$ be the projectire mapping (homography) $\psi_1 \mapsto \psi_2$ due to some plane $\pi$. Let A be scaled to satisfy $p'_o \cong Ap_o+v'$, where $p_o \in \psi_1$ and $p'_o \in \psi_2$ are corresponding points coming from an arbitrary point $P_o \notin \pi$. Then, for any corresponding pair p $\in \psi_1$ and p' $\in \psi_2$ coming from an arbitrary point P $\in P^3$, we have $$p' \cong Ap+kv'.$$

The coefficient k is independent of $\psi_2$, i.e., is invariant to the choice of the second view.

Note that the particular case where the homography A is affine, and the epipole v' is on the line at infinity, corresponds to the construction of affine structure from two orthographic views. In a nutshell, a representation $R_0$ of $P^3$ (tetrad of coordinates) can always be chosen such that an arbitrary plane $\pi$ is the plane at infinity. Then, a general uncalibrated camera motion generates representations R which can be shown to be related to $R_0$ by an element of the affine group. Thus, the scalar k is an affine invariant within a projective framework, and is called a relative affine invariant. A ratio of two such invariants, each corresponding to a different reference plane, is a projective invariant. For our purposes, there is no need to discuss the methods for recovering k—all we need is to use the existence of a relative affine invariant k associated with some arbitrary reference plane $\pi$ which, in turn, gives rise to a homography A.

Definition 1

Homographies $A_i \in PGL_3$ from $\psi_1 \mapsto \psi_i$ due to the same plane $\pi$, are said to be scale-compatible if they are scaled to satisfy Lemma 1, i.e., for any point $P \in \Phi$ projecting onto $p \in \psi_1$ and $p^i \in \psi_i$, there exists a scalar k that satisfies $$p^i \cong A_i p + k v^i,$$

for any view $\psi_i$, where $v^i \in \psi_i$ is the epipole with $\psi_1$ (scaled arbitrarily).

Lemma 2 (Auxiliary—Uniqueness)

Let $A, A' \in PGL_3$ be two homographies of $\psi_1 \mapsto \psi_2$ due to planes $\pi_1, \pi_2$, respectively. Then, there exists a scalar s, that satisfies the equation:

$$A - sA' = [\alpha v', \beta v', \gamma v'],$$

for some coefficients $\alpha, \beta, \gamma$.

Proof: Let $q \in \psi_1$ be any point in the first view. There exists a scalar $s_q$ that satisfies $v' \cong Aq - s_q A'q$. Let $H = A - s_q A'$, and we have $H_q \cong v'$. But $Av \cong v'$ for any homography $\psi_1 \mapsto \psi_2$ due to any plane. Therefore, $Hv \cong v'$ as well. The mapping of two distinct points q, v onto the same point v' could happen only if H is the homography due to the meridian plane (coplanar with the projection center O), thus $Hp \cong v'$ for all $p \in \psi_1$, and $s_q$ is a fixed scalar s. The latter, in turn, implies that H is a matrix whose columns are multiples of v'. □

Lemma 3 (Auxiliary for Lemma 4)

Let $A, A' \in PGL_3$ be homographies from $\psi_1 \mapsto \psi_2$ due to distinct planes $\pi_1, \pi_2$, respectively, and $B, B' \in PGL_3$ be homographies from $\psi_1 \mapsto \psi_3$ due to $\pi_1, \pi_2$, respectively. Then, $A' = AT$ for some $T \in PGL_3$, and $B = BCTC^{-1}$, where $Cv \cong \bar{v}$.

Proof: Let $A = A_2^{-1} A_1$, where $A_1, A_2$ are homographies from $\psi_1, \psi_2$ onto $\pi_1$, respectively. Similarly $B = B_2^{-1} B_1$, where $B_1, B_2$ are homographies from $\psi_1, \psi_3$ onto $\pi_1$, respectively. Let $A_1 \bar{v} = (c_1, c_2, c_3)^T$, and let $C \cong A_1^{-1} diag(c_1, c_2, c_3) A_1$. Then, $B_1 \cong A_1 C^{-1}$, and thus, we have $B \cong B_2^{-1} A_1 C^{-1}$. Note that the only difference between $A_1$ and $B_1$, is due to the different location of the epipoles v, $\bar{v}$, which is compensated by C ($Cv \cong \bar{v}$). Let $E_1 \in PGL_3$ be the homography from $\psi_1$ to $\pi_2$, and $E_2 \in PGL_3$ the homography from $\pi_2$ to $\pi_1$. Then with proper scaling of $E_1$ and $E_2$ we have $$A' = A_2^{-1} E_2 E_1 = AA_1^{-1} E_2 E_1 = AT,$$

and with proper scaling of C we have, $$B' = B_2^{-1} E_2 E_1 C^{-1} = BCA_1^{-1} E_2 E_1 C^{-1} = BCTC^{-1}.$$

Lemma 4 (Auxiliary—Uniqueness)

For scale-compatible honmographies the scalars s, $\alpha, \beta, \gamma$ of Lemma 2 are in variants indexed by $\psi_1, \pi_1, \pi_2$. That is, given an arbitrary third view $\psi_3$, let B, B' be the homographies from $\psi_1 \mapsto \psi_3$ due to $\pi_1, \pi_2$, respectively. Let B be scale-compatible with A, and B' be scale-compatible with A'. Then, $$B - sB' = [\alpha v'', \beta v'', \gamma v''].$$

Proof: We show first that s is invariant, i.e., that B−sB' is a matrix whose columns are multiples of v''. From lemma 2, and Lemma 3 there exists a matrix If, whose columns are multiples of v', a matrix T that satisfies A'=AT, and a scalar s such that $I - sT = A^{-1}H$. After multiplying both sides by BC, and then pre-multiplying by $C^{-1}$ we obtain $$B - sBCTC^{-1} = BCA^{-1}HC^{-1}.$$

From Lemma 3, we have $B' = BCTC^{-1}$. The matrix $A^{-1}H$ has columns which are multiples of v (because $A^{-1}v' \cong v$), $CA^{-1}H$ is a matrix whose columns are multiple of $\bar{v}$, and $BCA^{-1}H$ is a matrix whose columns are mlultiples of v''. Pre-multiplying $BCA^{-1}H$ by $C^{-1}$ does not change its form because every column of $BCA^{-1}HC^{-1}$ is simply a linear combination of the columns of $BCA^{-1}H$. As a result, B−sB' is a matrix whose columns are multiples of v''.

Let $H = A - sA'$ and $\hat{H} = B - sB'$. Since the homographies are scale compatible, we have from Lemnma 1 the existence of invariants k, k' associated with an arbitrary $p \in \psi_1$, where k is due to $\pi_1$, and k' is due to $\pi_2$: $p' \cong Ap + kv' \cong A'p + k'v'$ and $p'' \cong Bp + kv'' \cong B'p + k'v''$. Then from Lemma 2 we have $Hp = (sk'-k)v'$ and $\hat{H}p = (sk'-k)v''$. Since p is arbitrary, this could happen only if the coefficients of the multiples of v' in H and the coefficients of the multiples of v'' in $\hat{H}$, coincide. □

Proof of Theorem: Lemma 1 provides the existence part of theorem, as follows. Since Lemma 1 holds for any plane, choose a plane $\pi_1$ and let A, B be the scale-compatible homographies $\psi_1 \mapsto \psi_2$ and $\psi_1 \mapsto \psi_3$, respectively. Then, for every point $p \in \psi_1$, with corresponding points $p' \in \psi_2; p'' \in \psi_3$, there exists a scalar k that satisfies: $p' \cong Ap + kv'$, and $p'' \cong Bp + kv''$. We can isolate k from both equations and obtain:

$$k = \frac{v_1' - x'v_3'}{(x'a_3 - a_1)^T p} = \frac{v_2' - y'v_3'}{(y'a_3 - a_2)^T p} = \frac{y'v_1' - x'v_2}{(x'a_2 - y'a_1)^T p}, \quad (1)$$

$$k = \frac{v_1'' - x''v_3''}{(x''b_3 - b_1)^T p} = \frac{v_2'' - y''v_3''}{(y''b_3 - b_2)^T p} = \frac{y''v_1'' - x''v_2''}{(X''b_2 - y''b_1)^T p}, \quad (2)$$

where $b_1, b_2, b_3$ and $a_1, a_2, a_3$ are the row vectors of A and B and $v' = (v_1', v_2', v_3')$, $v'' = (v_1'', v_2'', v_3'')$. Because of the invariance of k we can equate terms of (1) with terms of (2) and obtain trilinear functions of image coordinates across three views. For example, by equating the first two terms in each of the equations, we obtain:

$$x''(v_3'b_3 - v_3''a_1)^T p - x''x'(v_3'b_3 - v_3''a_3)^T p + x'(v_3'b_1 - v_1''a_3)^T p - (v_1'b_1 - v_1''a_1)^T p 0, \quad (3)$$

In a similar fashion, after equating the first term of (1) with the second term of (2), we obtain:

$$y''(v_3'b_3 - v_3''a_1)^T p - y''x'(v_3'b_3 - v_3''a_3)^T p + x'(v_3'b_2 - v_2''a_3)^T p - (v_1'b_2 - v_2''a_1)^T p 0. \quad (4)$$

Both equations are of the desired form, with the first six coefficients identical across both equations.

The question of uniqueness arises because Lemma 1 holds for any plane. If we choose a different plane, say $\pi_2$, with homographies A', B', then we must show that the new homographies give rise to the same coefficients (up to an overall scale). The parenthesized terms in (3) and (4) have the general form: $v'_i b_j - v''_j a_i$, for some i and j. Thus, we need to show that there exists a scalar s that satisfies $$v''_j(a_i - sa'_i) = v'_i(b_j - sb'_j).$$

This, however, follows directly from Lemmas 2 and 4. □

The direct implication of the theorem is that one can generate a novel view ($\psi_3$) by simply combining two model views ($\psi_1$, $\psi_2$). The coefficients $\alpha_j$ and $\beta_j$ of the combination can be recovered together as a solution of a linear system of 17 equations (24-6-1) given nine corresponding points across the three views (more than nine points can be used for a least-squares solution).

In the next theorem we obtain the lower bound on the number of points required for solving for the coefficients of the trilinear functions. The existence part of the proof of Theorem 1 indicates that there exists nine trilinear functions of that type, with coefficients having the general form $v'_i b_j - v''_j a_i$. Thus, we have at most 27 distinct coefficients (up to a uniform scale), and thus, if more than two of the nine trilinear functions are linearly independent, we may solve for the coefficients using less than nine points. The next theorem shows that at most four of the trilinear functions are linearly independent and consequently seven points are sufficient to solve for the coefficients.

Theorem 2

There exists nine distinct trilinear forms of the type described in Theorem 1, of which at most four are linearly independent. The coefficients of the four trilinear forms can be recovered linearly with seven corresponding points across the three views.

Proof: The existence of nine trilinear forms follow directly from (1) and (2). Let $\alpha_{ij} = v'_i b_j - v''_j a_i$. The nine forms are given below (the first two are (3) and (4) repeated for convenience):

$$x''\alpha_{13}^T p - x''x'\alpha_{33}^T p + x'\alpha_{31}^T p - \alpha_{11}^T p = 0,$$

$$y''\alpha_{13}^T p - y''x'\alpha_{33}^T p + x'\alpha_{32}^T p - \alpha_{12}^T p = 0,$$

$$x''\alpha_{23}^T p - x''y'\alpha_{33}^T p + y'\alpha_{31}^T p - \alpha_{21}^T p = 0, \quad (5)$$

$$y''\alpha_{23}^T p - y''y'\alpha_{33}^T p + y'\alpha_{32}^T p - \alpha_{22}^T p = 0, \quad (6)$$

$$y'x'\alpha_{31}^T p - x'x'\alpha_{32}^T p + x''\alpha_{12}^T p - y''\alpha_{11}^T p = 0, \quad (7)$$

$$y'y'\alpha_{31}^T p - x'y'\alpha_{32}^T p + x''\alpha_{22}^T p - y''\alpha_{21}^T p = 0, \quad (8)$$

$$x''y'\alpha_{13}^T p - x''x'\alpha_{23}^T p + x'\alpha_{21}^T p - y'\alpha_{11}^T p = 0, \quad (9)$$

$$y''y'\alpha_{13}^T p - y''x'\alpha_{23}^T p + x'\alpha_{22}^T p - y'\alpha_{12}^T p = 0, \quad (10)$$

$$x''y'\alpha_{12}^T p - x''x'\alpha_{22}^T p + y''x'\alpha_{21}^T p - y''y'\alpha_{11}^T p = 0, \quad (11)$$

For a given triplet p, p', p'' the first four functions on the list produce a 4×27 matrix. The rank of the matrix is four because it contains four orthogonal columns (columns associated with $\alpha_{11}$, $\alpha_{12}$, $\alpha_{21}$ and $\alpha_{22}$), therefore these functions are linearly independent. Since we have 27 coefficients, and each triplet p, p', p'' contributes four linear equations then seven corresponding points across the three views provide a sufficient number of equations for a linear solution for the coefficients (given that the system is determined up to a common scale, seven points produce two extra equations which can be used for consistency checking or for obtaining a least squares solution).

The remaining trilinear forms are linearly spanned by the first four, as follows:

(7)=y''(3)−x''(4)

(8)=y''(5)−x''(6)

(9)=y'(3)−x'(5)

(10)=y'(4)−x'(6)

(11)=y''y'(3)−x''y'(4)+x''x'(6)−y''x'(5)

where the numbers in parenthesis represent the equation numbers of the various trilinear functions. □

Taken together, both theorems provide a constructive means for solving for the positions x'', y'' in a novel view given the correspondences p, p' across two model views. This process of generating a novel view can be easily accomplished without the need to explicitly recover structure, camera transformation, or even just the epipolar geometry—and requires fewer corresponding points than any other known alternative.

The solution for x'', y'' is unique without constraints on the allowed camera transformations. There are, however, certain camera configurations that require a different set of four triliniear functions from the one suggested in the proof of Theorem 2. For example, the set of equations (5), (6), (9) and (10) are also linearly independent. Thus, for example, in case $v'_1$ and $v'_3$ vanish simultaneously, i.e., $v' \cong (0, 1, 0)$, then that set should be used instead. Similarly, equations (3), (4), (9) and (10) are linearyl independent, and should be used in case $v' \cong (1, 0, 0)$. Similar situations arise with $v'' \cong (1, 0, 0)$ and $v'' \cong (0, 1, 0)$ which can be dealt by choosing the appropriate basis of four functions from the six discussed above. Note that we have not addressed the problem of singular configurations of seven points. For example, its clear that if the seven points are coplanar, then their correspondences across the three views could not possibly yield a unique solution to the problem of recovering the coefficients. The matter of singular surfaces has been studied for the eight-point case necessary for recovering the epipolar geometry. The same matter concerning the results presented in this manuscript is an open problem.

Moving away from the need to recover the epipolar geometry carries distinct and significant advantages. To get a better idea of these advantages, we consider briefly the process of reprojection using epipolar geometry. The epipolar intersection method can be described succinctly as follows. Let $F_{13}$ and $F_{23}$ be the matrices ("fundamental" matrices in recent terminology) that satisfy $p''F_{13}p=0$, and $p''F_{23}p'=0$. Then, by incidence of p'' with its epipolar line we have:

$$p'' \cong F_{13} p \times F_{23} p'. \quad (12)$$

Therefore, eight corresponding points across the three views are sufficient for a linear solution of the two fundamental matrices, and then all other object points can be re-projected onto the third view. Equation (12) is also a trilinear form, but not of the type introduced in Theorem 1. The differences include (i) epipolar intersection requires the correspondences coming from eight points, rather than seven, (ii) the position of p'' is solved by a line intersection process which is singular in the case the three camera centers are collinear; in the trilinearity result the components of p'' are solved separately and the situation of three collinear cameras is admissible, (iii) the epipolar intersection process is decomposable, i.e. only two views are used at a time; whereas the epipolar geometries in the trililearity result are intertwined and are not recoverable separately. The latter implies a better numerically behaved method in the presence of noise as well, and as will be shown later, the performance, even using the minimal number of required points, far exceeds the performance of epipolar intersection using many more points. In other words, by avoiding the need to recover the epipolar geometry we obtain a significant practical advantage as well, since the epipolar geometry is the most error-sensitive component when working with perspective views.

The connection between the general result of trilinear functions of views and the "linear combinations of views" result for orthographic views, can easily be seen by setting A and B to be affine in $P^2$, and $v'_3 = v''_3 = 0$. For example, (3) reduces to $$v'_1 x'' - v''_1 x' + (v''_1 a_1 - v'_1 b_1)^T p = 0,$$

which is on the form $$\alpha_1 x'' + \alpha_2 x' + \alpha_3 x + \alpha_4 y + \alpha_5 = 0.$$

As in the perspective case, each point contributes four equations, but here there is no advantage for using all four of them to recover the coefficients, therefore we may use only two out of the four equations, and require four corresponding points to recover the coefficients. Thus, in the case where all three views are orthographic, $x''$ ($y''$) is expressed as a linear combination of image coordinates of the two other views—as discovered by Ullman and Basri.

IV. THE BILINEAR FORM

Consider the case for which the two reference (model) views of an object are taken orthographically (using a tele lens would provide a reasonable approximation), but during recognition any perspective view of the object is allowed. It can easily be shown that the three views are then connected via bilinear functions (instead of trilinear):

Theorem 3 (Bilinearity)

Within the conditions of Theorem 1, in case the views $\psi_1$ and $\psi_2$ are obtained by parallel projection, then the pair of trilinear forms of Theorem 1 reduce to the following pair of bilinear equations:

$$x''(\alpha_1 x + \alpha_2 y + \alpha_3) + \alpha_4 x'' x' + \alpha_5 x' + \alpha_6 x + \alpha_7 y + \alpha_8 = 0,$$

and $$y''(\beta_1 x + \beta_2 y + \beta_3) + \beta_4 y'' x' + \beta_5 x' + \beta_6 x + \beta_7 y + \beta_8 = 0,$$

where $\alpha_j = \beta_j$, $j = 1, \ldots, 4$.

Proof: Under these conditions we have from Lemma 1 that A is affine in $P^2$ and $v'_3 = 0$, therefore (3) reduces to:

$$x''(v'_1 b_3 - v''_3 a_1)^T p + v''_3 x'' x' - v''_1 x' + (v''_1 a_1 - v'_1 b_1)^T p = 0.$$

Similarly, (4) reduces to:

$$y''(v'_1 b_3 - v''_3 a_1)^T p + v''_3 y'' x' - v''_2 x' + (v''_2 a_1 - v'_1 b_2)^T p = 0.$$

Both equations are of the desired form, with the first four coefficients identical across both equations. □

The remaining trilinear forms undergo a similar reduction, and Therem 2 still holds, i.e., we still have four linearlyl independent bilinear forms. Consequently, we have 21 coefficients up to a common scale (instead of 27) and four equations per point, thus five corresponding points (instead of seven) are sufficient for a linear solution.

A bilinear function of three views has two advantages over the general trilinear function. First, as mentioned above, only five corresponding points (instead of seven) across three views are required for solving for the coefficients. Second, the lower the degree of the algebraic function, the less sensitive the solution may be in the presence of errors in measuring correspondences. In other words, it is likely (though not necessary) that the higher order terms, such as the term x"x'x in Equation 3, will have a higher contribution to the overall error sensitivity of the system.

Compared to the case when all views are assumed orthographic, this case is much less of an approximation. Since the model views are taken only once, it is not unreasonable to require that they be taken in a special way, namely, with a tele lens (assuming we are dealing with object recognition, rather than scene recognition). If this requirement is satisfied, then the recognition task is general since we allow any perspective view to be taken during the recognition process.

V. EXPERIMENTAL DATA

The experiments described in this section were done in order to evaluate the practical aspect of using the trillinear result for re-projection compared to using epipolar intersection and the linear combination result of Ullman and Basri (the latter we have shown is simply a limiting case of the trilinear result).

The epipolar intersection method was implemented as described in Section III by recovering first the fundamental matrices. Although eight corresponding points are sufficient for a linear solution, in practice one would use more than eight points for recovering the fundamental matrices in a linear or non-linear squares method. Since linear least squares methods are still sensitive to image noise, we used the implementation of a non-linear method described in Q. T. Luong, et al., "On determining the fundamental matrix: Analysis of different methods and experimental results." Technical report of INRIA, France, 1993 (hereinafter "Luong, et al.") which was kindly provided by T. Luong and L. Quan (these were two implementations of the method proposed in Luong,. et al. in each case, the implementation that provided the better results was adopted).

THe first experiment is with simulation data showing that even when the epipolar geometry is recovered accurately, it is still significantly better to use the trilinear result which avoids the process of line intersection. The second experiment is done on a real set of images, comparing the performance of the various methods and the number of corresponding points that are needed in practice to achieve reasonable re-projection results.

A. Computer Simulations

We used an object of 46 points placed randomly with z coordinates between 100 units and 120 units, and x, y coordinates ranging randomly between −125 and +125. Focal length was of 50 units and the first view was obtained by $fx/z$, $fy/z$. The second view ($\psi_2$) was generated by a rotation around the point (0, 0, 100) with axis (0.14, 0.7, 0.7) and by an angle of 0.3 radians. The third view ($\psi_3$) was generated by a rotation around an axis (0, 1, 0) with the same translation and angle. Various amounts of random noise was applied to all points that were to be re-projected onto a third view, but not to the eight or seven points that were used for recovering the parameters (fundamental matrices, or trilinear coefficients). The noise was random, added separately to each coordinate and with varying levels from 0.5 to 2.5 pixel error. We have done 1000 trials as follows: 20 random objects were created, and for each degree of error the simulation was ran 10 times per object. We collected the maximal re-projection error (in pixels) and the average re-projection error (averaged of all the points that were re-projected). These numbers were collected separately for each degree of error by averaging over all trials (200 of them) and recording the standard deviation as well. Since no error were added to the eight or seven points that were used to determine the epipolar geometry and the trilinear coefficients, we simply solved the associated linear systems of equations required to obtain the fundamental matrices or the trilinear coefficients.

Figure 1A:
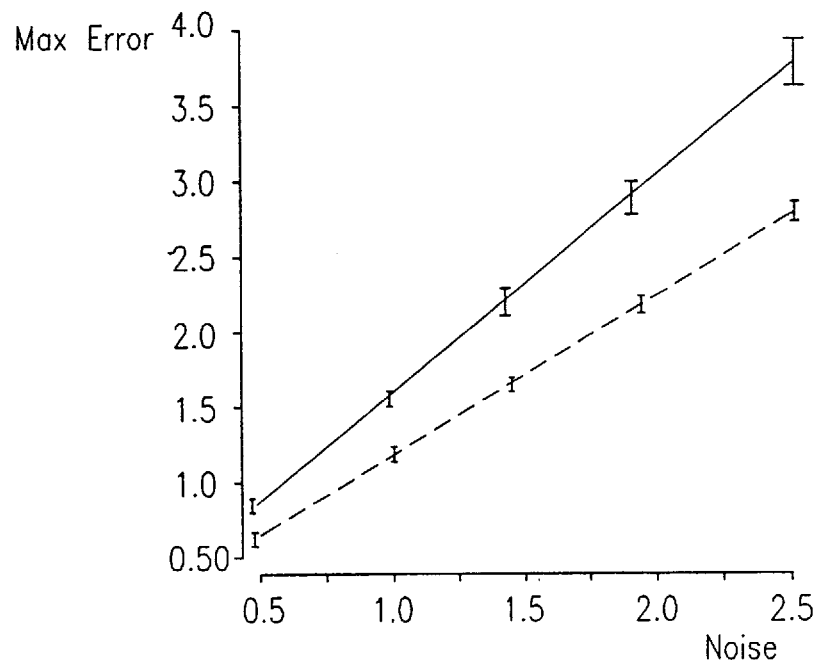
Figure 1B:
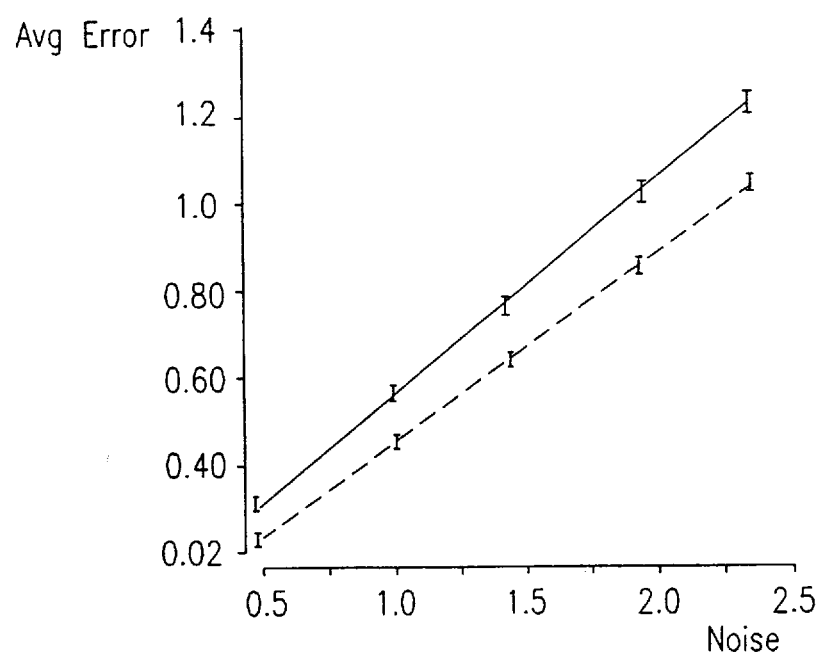

The results are shown in FIG. 1A–1B. The graph on the left shows the performance of both algorithms for each level of image noise by measuring the maximal re-projection error. We see that under all noise levels, the trilinear method is significantly better and also has a smaller standard deviation. Similarly for the average re-projection error shown in the graph on the right.

This difference in performance is expected, as the trilinear method takes all three views together, rather than every pair separately, and thus avoids line intersectios.

B. Experiments On Real Images

Figure 2A:
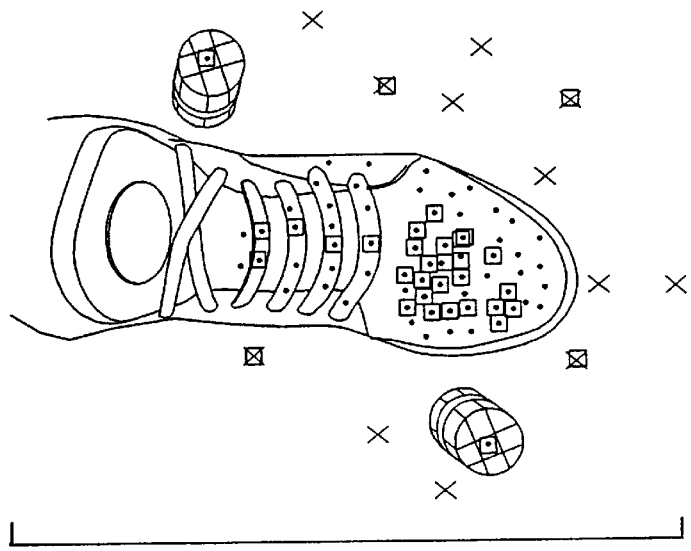
Figure 2B:
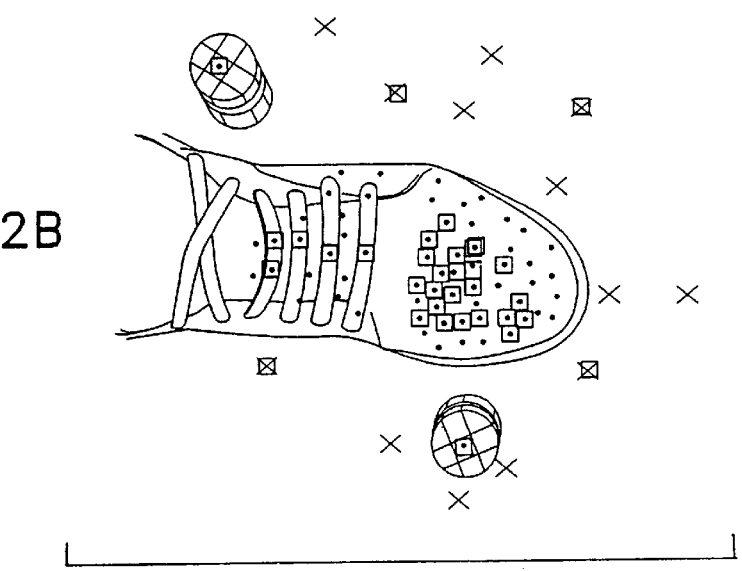
Figure 2C:
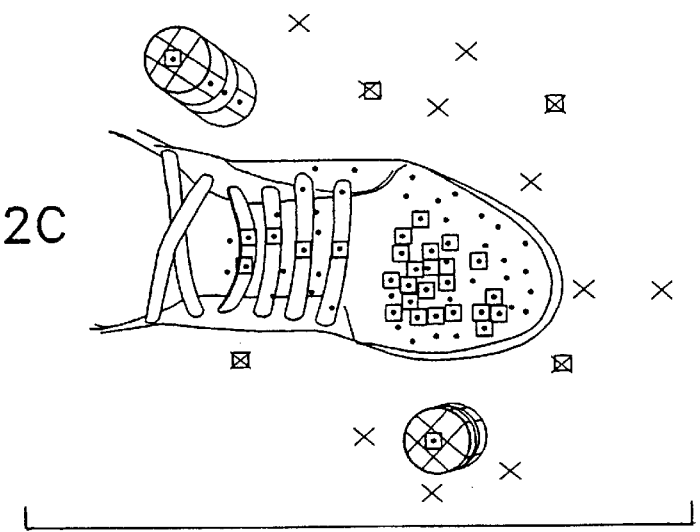

FIG. 2A–2C shows three views of the object we selected for the experiment. The object is a sports shoe with added texture to facilitate the correspondence process. This object was chosen because of its complexity i.e., it has a shape of a natural object and cannot easily be described parametrically (as a collection of planes or algebraic surfaces). Note that the situation depicted here is challenging because the re-projected view is not in-between the two model views, i.e., one should expect a larger sensitivity to image noise than in-between situations. A set of 34 points were manually selected on one of the frames $\psi_1$, and their correspondences were automatically obtained along all other frames used in this experiment. The correspondence process is based on an implementation of a coarse-to-fine optical-flow algorithm described in Bergen, et al., "Hierarchical motion-based frame rate conversion," Technical Report, David Sarnoff Research Center, 1990 (hereinafter "Bergen, et al."). To achieve accurate correspondences across distant views, intermediate in-between frames were taken and the displacements across consecutive frames were added. The overall displacement field was then used to push ("warp") the first frame towards the target frame and thus create a synthetic image. Optical-flow was applied again between the synthetic frame and the target frame and the resulting displacement was added to the overall displacement obtained earlier. This process provides a dense displacement field which is then sampled to obtain the correspondences of the 34 points initially chosen in the first frame. The results of this process are shown in FIG. 2A–2C by displaying squares centered around the computed locations of the corresponding points. One can see that the correspondences obtained in this manner are reasonable, and in most cases to sub-pixel accuracy. One can readily automate further this process by selecting points in the first frame for which the Hessian matrix of spatial derivatives is well conditioned—similar to the confidence values suggested in the implementations of P. Anadan, "A unified perspective on computational techniques for the measurement of visual motion," in *Proceedings Image Understanding Workshop*, pages 219–230, Los Angeles, Calif., February 1987 (Morgan Kaufman, San Mateo, Calif., Tomasi, et al., "Factoring image sequences into shape and motion," in *IEEE Workshop on Visual Motion*, pages 21–29, Princeton, N.J., September 1991, and Bergen, et al. however, the intention here was not so much as to build a complete system but to test the performance of the trilinear re-projection method and compare it to the performance of epipolar intersection and the linear combination methods.

The trilinear method requires at least seven corresponding points across the three views (we need 26 equations, and seven points provide 28 equations), whereas epipolar intersection can be done (in principle) with eight points. The question we are about to address is what is the number of points that are required in practice (due to errors in correspondence, lens distortions and other effects that are not adequately modeled by the pin-hole camera model) to achieve reasonable performance?

Figure 3A:
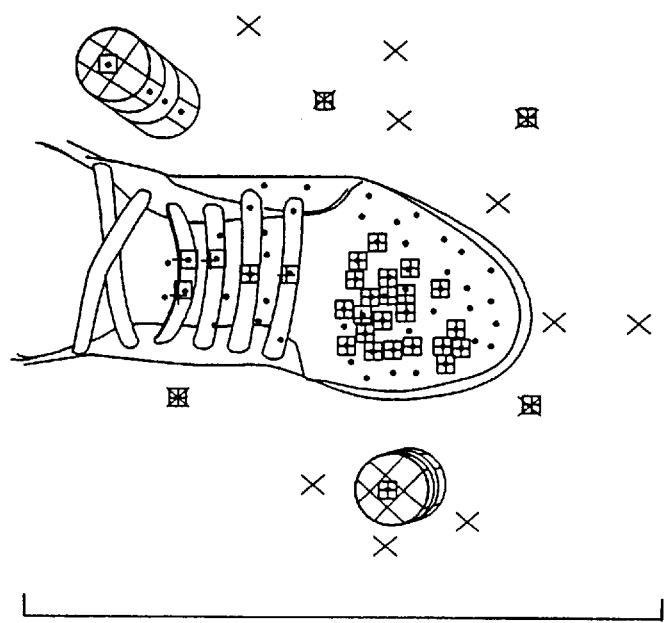
Figure 3B:
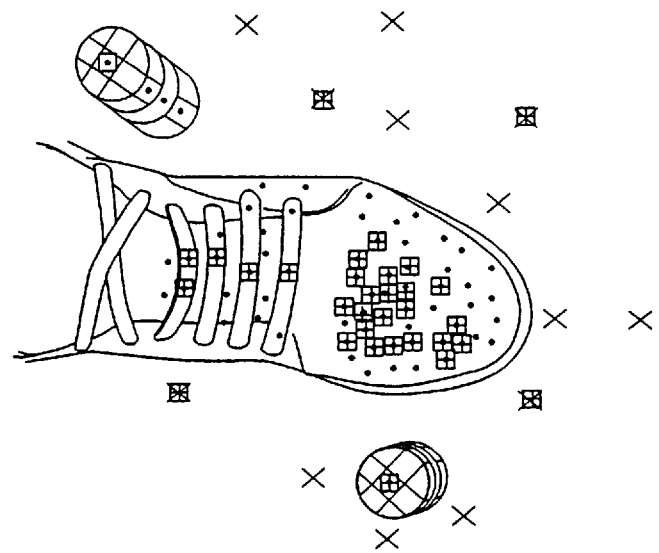

The trilinear results was first applied with the minimal number of points (seven) for solving for the coefficients, and then applied with 8, 9 and 10 points using a linear least-squares solution (note that in general, better solutions may be obtained by using SVD or Jacobi methods instead of linear least-squares, but that was not attempted here). The results are shown in FIG. 3A–3B. Seven points provide a re-projection with maximal error of 3.3 pixels and average error of 0.98 pixels. The solution using 10 points provided an improvement with maximal error of 1.44 and average error of 0.44 pixels. The performance using eight and nine points was reasonably in-between the performances above. Using more points did not improve significantly the results; for example, when, all 31 points were used the maximal error went down to 1.14 pixels and average error stayed at 0.12 pixels.

Figure 4A:
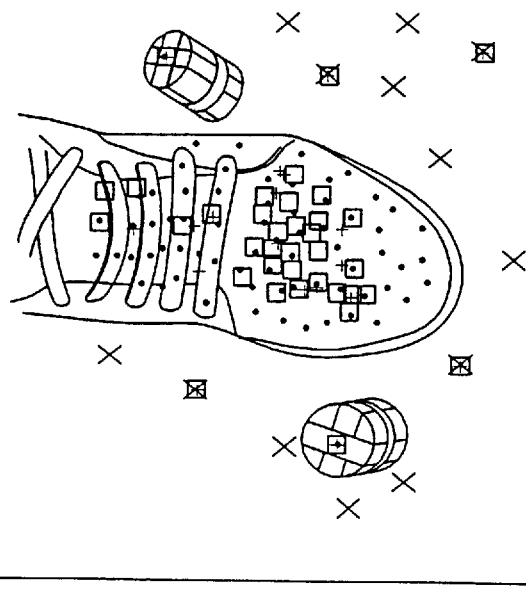
Figure 4B:
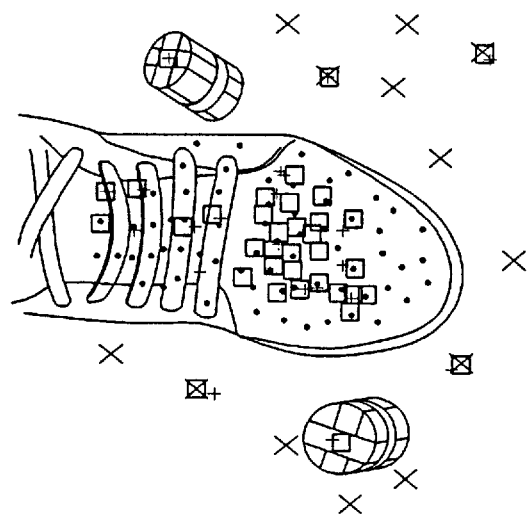

Next the epipolar intersection method was applied. We used two methods for recovering the fundamental matrices. One method is by using the implementation of Luong, et al., and the other is by taking advantage that four of the corresponding points are coming from a plane (the ground plane). In the former case, much more than eight points were required in order to achieve reasonable results. For example, when using all the 34 points, the maximal error was 43.4 pixels and the average error was 9.58 pixels. In the latter case, we recovered first the homography B due to the ground plane and then the epipole v″ using two additional points (those on the film cartridges). It is then known (see) that $F_{13}=[v″]B$, where $[v″]$ is the anti-symmetric matrix of v″. A similar procedure was used to recover $F_{23}$. Therefore, only six points were used for re-projection, but nevertheless, the results were slightly better: maximal error of 25.7 pixels and average error of 7.7 pixels. FIG. 4A–4B shows these results.

Figure 5A:
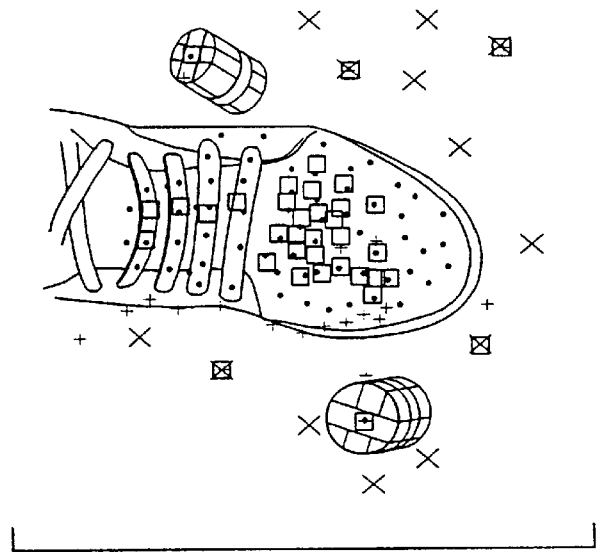
Figure 5B:
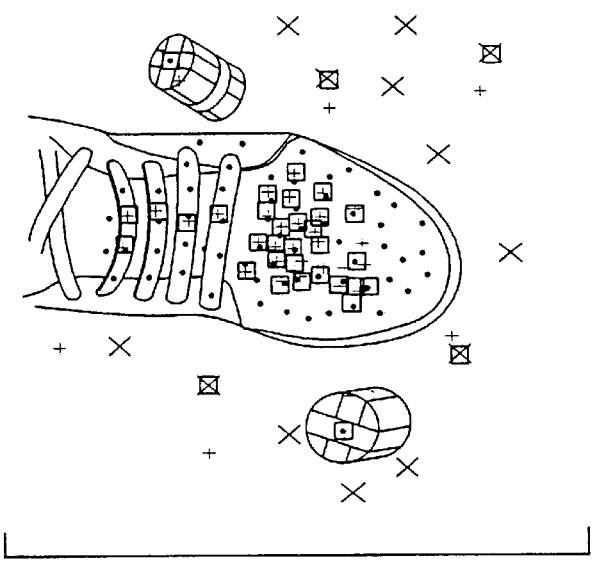
Figure 5C:
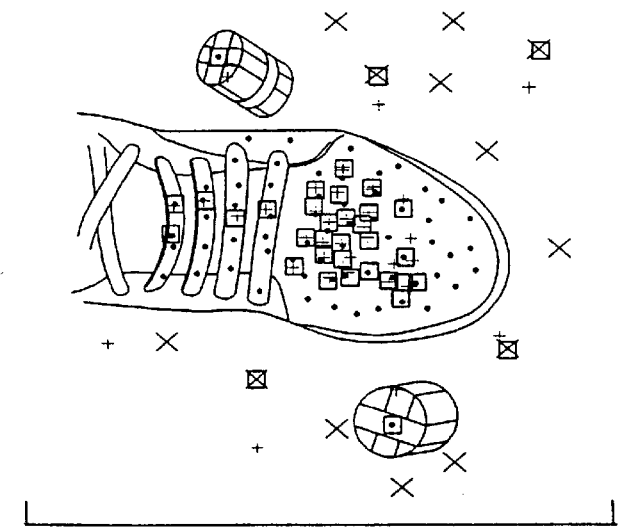

Finally, we tested the performance of re-projection using the linear combination method. Since the linear combination method holds only for orthographic views, we are actually testing the orthographic assumption under a perspective situations, or in other words, whether the higher (bilinear and trilinear) order terms of the triliiear equations are significant or not. The linear combination method requires at least four corresponding points across the three views. We applied the method with four, 10 (for comparison with the trilinear case shown in FIG. 3A–3B), and all 34 points (the latter two using linear least squares). The results are displayed in FIG. 5A–5C. The performance in all cases are significantly poorer than when using the trilinear functions, but better than the epipolar intersection method.

VI. DISCUSSION

We have seen that any view of a fixed 3D object can be expressed as a trilinear function with two reference views in the general case, or as a bilinear function when the reference views are created by means of parallel projection. These functions provide alternative, much simpler, means for manipulating views of a scene than other methods. Moreover, they require fewer corresponding points in theory, and much fewer in practice. Experimental results show that the trilinear functions are also useful in practice yielding performance that is significantly better than epipolar intersection or the linear combination method.

In general two views admit a "fundamental" matrix representing the epipolar geometry between the two views, and whose elements are subject to a cubic constraint (rank of the matrix is 2). The trilinearity results (Theorems 1,2) imply that three views admit a tensor with 27 distinct elements. We have seen that the tensor does not fail in cases where the epipolar constraint fails, such as when the three cameras are along a straight line (not an uncommon situation). The issue of singular configurations of 7 points (besides the obvious singular configuration of 7 coplanar points) was not addressed in this manuscript. However the robustness of the re-projection results may indicate that either such configurations are very rare or do not exist. It would be, thus, important to investigate this issue as it is widely believed that the numerical instability of the epipolar constraint lies in the existence of such critical surfaces. The notion of the "trilinear" tensor, its properties, relation to the geometry of three views, and applications to 3D reconstruction from multiple views, constitutes an important future direction.

The application that was emphasized throughout the manuscript is visual recognition via alignment. Reasonable performance was obtained with the minimal number of required points (seven) with the novel view ($\psi_3$)—which may be too many if the image to model matching is done by trying all possible combinations of point matches. The existence of bilinear functions in the special case where the model is orthographic, but the novel view is perspective, is more encouraging from the standpoint of counting points. Here we have the result that only five corresponding points are required to obtain recognition of perspective views (provided we can satisfy the requirement that the model is orthographic). We have not experimented with bilinear functions to see how many points would be needed in practice, but plan to do that in the future. Because of their simplicity, one may speculate that these algebraic functions will find uses in tasks other than visual recognition—some of those are discussed below.

There may exist other applications where simplicity is of major importance, whereas the number of points is less of a concern. Consider for example, the application of model-based compression. With the trilinear functions we need 17 parameters to represent a view as a function of two reference views in full correspondence (recall, 27 coefficients were used in order to reduce the number of corresponding points from nine to seven). Assume both the sender and the receiver have the two reference views and apply the same algorithm for obtaining correspondences between the two views. To send a third view (ignoring problems of self occlusions that may be dealt with separately) the sender can solve for the 17 parameters using many points, but eventually send only the 17 parameters. The receiver then simply combines the two reference views in a "trilinear way" given the received parameters. This is clearly a domain where the number of points is not a major concern, whereas simplicity, and robustness (as shown above) due to the short-cut in the computations, is of great importance.

Related to image coding, an approach of image decomposition into "layers" was recently proposed. In this approach a sequence of views is divided up into regions whose motion of each is described approximately by a 2D affine transformation. The sender sends the first image followed only by the six affine parameters for each region for each subsequent frame. The use of algebraic functions of views can potentially make this approach more powerful because instead of dividing up the scene into planes one can attempt to divide the scene into objects, each carries the 17 parameters describing its displacement onto the subsequent frame.

Another area of application may be in computer graphics. Re-projection techniques provide a short-cut for image rendering. Given two fully rendered views of some 3D object, other views (again ignoring self-occlusions) can be rendered by simply "combining" the reference views. Again, the number of corresponding points is less of a concern here.

It is appreciated that some or all of the image processing operations shown and described herein may be implemented in software. Alternatively, some or all of the image processing operations shown and described herein may be implemented in ROM (read-only memory) form. The software components may, alternatively, be implemented in hardware, if desired, using conventional techniques.

The present invention has very broad applications and specifically is applicable in all fields in which 3D from 2D techniques are known to be useful. Applications of the present invention include at least the following: photogrammetry applications comprising map making from aerial and satellite photographs and coordinate measurements in aerospace and shipyard assembly plants, coordinate measurements of industrial parts (CMM), automated optical based inspection of industrial parts, robotic cell alignment, robotic trajectory identification, 3D robotic feedback, 3D modelling of scenes, 3D modelling of objects, reverse engineering, and 3D digitizing.

Appendix B is a listing of a preferred software implementation of 3D reconstruction apparatus constructed and operative in accordance with a preferred embodiment of the present invention. To implement the 3D reconstruction apparatus based on Appendix B, Maple2 software, commercially available from Math-Soft, may be employed in conjunction with an IBM or SUN workstation. The following procedure may be employed:

a. Programs generated from the listing of Appendix B may be loaded into Maple2 using the OPEN FILE command.

b. The subroutines may be run by bringing the cursor to the row on which appears the WITH (LINALG) command.

c. The RETURN key is then processed until the cursor reaches the end of the file.

d. The cursor is then returned to the beginning of the file.

e. The simulation is run by pressing RETURN until the following row is reached, inclusive:

EVALN (PCOMP)

The system then prints on the screen a comparison between the given 3D world and the reconstructed 3D world.

It is appreciated that the listing of Appendix B is also useful in implementing the image transfer apparatus and method shown and described herein. The image transfer embodiment may, for example, be based on the listing of Appendix B used in conjunction with Equations 3 and 4 of the above section entitled Algebraic Function for Recognition.

It is appreciated that the particular embodiments described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. An image processing system for generating an image of a scene from three views of the scene, the image processing system comprising:
   A. a planar view processor for identifying from the three planar views a set $P_s$ of at least one point P in the scene which has a respective projection in all three views;
   B. a trilinear tensor generator for generating from the set $P_s$ a trilinear tensor T having components $\alpha_{ijk}$ conforming to $$\alpha_{ijk} = v'_i b_{jk} - v''_j a_{ik} (i, j, k=1, 2, 3),$$

where $v'_i$ and $v''_j$ are components of vectors v' and v", and $a_{jk}$ and $b_{jk}$ are components of matrices A and B defined such that, for each point $P \subset P_s$ in the set, projection points p, p' and p" onto the respective first, second and third views have coordinates in the respective view given by
   p=[I,0]P (where "I" represents an identity matrix),
   p'≅[A,v']P (where "≅" represents equality up to a scale factor), and
   p"≅[B,v"]P,
   A, B, v' and v" being the same for projection points p, p' and p" for point $P \subset P_s$; and
   C. an image generator for utilizing the trilinear tensor T to generate the image of said scene.

2. An image processing system as defined in claim 1 in which said set $P_s$ comprises a plurality of points P, each point P having a projection in all three views.

3. An image processing system as defined in claim 1 further comprising a planar view generator for generating said three planar views.

4. The image processing system as defined in claim 3 in which said trilinear tensor generator generates the components $\alpha_{ijk}$ of the trilinear tensor T in accordance with $$x''\alpha_{13.}^T p - x''x'\alpha_{33.}^T p + x'\alpha_{31.}^T p - \alpha_{11.}^T p = 0,$$

$$y''\alpha_{13.}^T p - y''x'\alpha_{33.}^T p + x'\alpha_{32.}^T p - \alpha_{12.}^T p = 0,$$

$$x''\alpha_{23.}^T p - x''y'\alpha_{33.}^T p + y'\alpha_{31.}^T p - \alpha_{21.}^T p = 0,$$

and $$y''\alpha_{23.}^T p - y''y'\alpha_{33.}^T p + y'\alpha_{32.}^T p - \alpha_{22.}^T p = 0$$

for said points $P_s$, where each point p' has coordinates (x', y', 1)$^T$ and each point p" has coordinates (x", y", 1)$^T$, $a_{ij.}$ for each "i" and "j" (i, j=1, 2, 3) represents a vector of said trilinear tensor, and "T" represents a transpose operation.

5. An image processing system as defined in claim 2 in which said set $P_s$ comprises seven points P, each point P having a projection in all three views.

6. An image processing system as defined in claim 1 in which said image generator generates said image as a two-dimensional image.

7. An image processing system as defined in claim 6 in which said image generator displays the image generated thereby.

8. An image processing system as defined in claim 6 in which said image generator utilizes the trilinear tensor T to generate, from coordinates for projection points in two of said views for a point $P_x$ in the scene, coordinates for a corresponding projection point in the third of said views, the corresponding projection point comprising a point in said image.

9. An image processing system as defined in claim 8 in which said image generator generates the coordinates for the corresponding projection point by plugging into the trilinear tensor T the coordinates for the projection points in said two of said views.

10. An image processing system as defined in claim 6 in which said image is of said scene at a particular point in time, the image processing system further including a comparator for comparing said image to another image of said scene at a different point in time thereby to facilitate the identification of differences in the scene at the respective points in time.

11. An image processing system as defined in claim 1 in which said image generator generates said image as a three-dimensional image.

12. An image processing system as defined in claim 11 further comprising a novel view generator for generating, from said three-dimensional image, a two-dimensional image comprising a novel view of said scene from a predetermined direction.

13. An image processing system as defined in claim 12 in which said image generator further displays the image generated thereby.

14. An image processing system as defined in claim 13, the system generating said image from more than three views,
   A. said planar view processor identifying, for each of a plurality of subsets "m" of three of said planar views, two of said views being the same for all of said subsets "m," a set $P_s$ of at least one point P in the scene which has a projection in all three views of the respective subset;
   B. said trilinear tensor generator for generating, for each subset "m," a trilinear tensor $T_m$ having components $\alpha_{ijk,m}$;
   C. said image processing system further comprising a correspondence matrix generating element comprising:
      i. a correspondence matrix generator for generating, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$; and
      ii. a concatenation element for concatenating the correspondence matrices $G_m$ for the respective subsets together, thereby to generate a concatenated correspondence matrix $CG_m$; and
   D. said epipolar line generator generates each said epipolar line as the cross product of corresponding columns of four largest principal components of the concatenated correspondence matrix $CG_m$.

15. An image processing system as defined in claim 14 in which said each set $P_s$ comprises a plurality of points P, each point P having a projection in all three views of the respective set "m."

16. An image processing system as defined in claim 15 in which each said set $P_s$ comprises seven points P, each point P having a projection in all three views of the respective set "m."

17. An image processing system as defined in claim 11 in which said scene includes at least one object, the image processing system further comprising an image comparator for performing a comparison operation in connection with a portion of the image corresponding to the object and a predetermined model for said object.

18. An image processing system as defined in claim 17 in which the image comparator, if it determines that a difference exists between the portion of the image corresponding to the object and the predetermined model, further compares said difference with a predetermined tolerance.

19. An image processing system as defined in claim 1 in which said image generator comprises:
   A. a fundamental matrix generator for generating a fundamental matrix F from the trilinear tensor T;
   B. an epipole generator for generating coordinates for an epipole v' in said second view;
   C. an affine depth generator for using the fundamental matrix F, said coordinates for said epipole v', and coordinates $(x_r, y_r)$ and $(x'_r, y'_r)$ of corresponding points $p_r$ and $p'_r$ in said respective first and second views to generate an affine depth value $\kappa_r$, thereby to provide coordinates for $(x, y, 1, \kappa_r)$ for a point $P_r$ in the scene.

20. An image processing system as defined in claim 19 in which said fundamental matrix generator generates the fundamental matrix F as $E_j^T F + F^T E_j = 0$ (j=1, 2, 3), where $E_j$ are three matrices $E_j = \alpha_{1j1}, \alpha_{1j2}, \ldots, \alpha_{3j3}$ and "T" represents a transpose operation.

21. An image processing system as defined in claim 20, the system generating said image from more than three views,
   A. said planar view processor identifying, for each of a plurality of subsets "m" of three of said planar views, two of said views being the same for all of said subsets "m," a set $P_s$ having at least one point P in the scene which has a projection in all three views of the respective subset;
   B. said trilinear tensor generator generates, for each subset "m," a trilinear tensor $T_m$ having components $\alpha_{ijk,m}$;
   C. said image processing system further comprising a correspondence matrix generating element comprising:
      i. a correspondence matrix generator for generating, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$;
      ii. a concatenation element for concatenating the correspondence matrices $G_m$ for the respective subsets together, thereby to generate a concatenated correspondence matrix $CG_m$; and
   D. said fundamental matrix generator generates the fundamental matrix F as $C_k^T F + F^T C_k = 0$ (k=1, 2, 3, 4) where each $C_k$ represents one of four largest principal components of the concatenated correspondence matrix $CG_m$ and "T" represents a transpose operation.

22. An image processing system as defined in claim 21 in which said each said set $P_s$ comprises a plurality of points P, each point P having a projection in all three views.

23. An image processing system as defined in claim 22 in which each said set $P_s$ comprises seven points P, each point P having a projection in all three views.

24. An image processing system as defined in claim 19 in which said affine depth generator generates said affine depth $\kappa$ in conformance with $p'_r \cong [v']F\, p_r + \kappa\, v'$.

25. An image processing system as defined in claim 19 in which said image generator comprises:
   A. a homography generator for generating a homography matrix $E_i$ from the trilinear tensor T;
   B. an epipole generator for generating coordinates for an epipole v' in said second view;
   C. an affine depth generator for using the homography matrix $E_i$, said coordinates for said epipole v', and coordinates $(x_r, y_r)$ and $(x'_r, y'_r)$ of corresponding points $p_r$ and $p'_r$ in said respective first and second views to generate an affine depth value $\kappa_r$, thereby to provide coordinates for $(x, y, 1, \kappa_r)$ for a point $P_r$ in the scene.

26. An image processing system as defined in claim 25 in which said affine depth generator generates the affine depth value $\kappa_r$ in accordance with $p'_r \cong E_i\, p_r + \kappa\, v'$.

27. An image processing system as defined in claim 21 further comprising a planar view generator for generating said more than three views.

28. An image processing system as defined in claim 27 in which said epipole coordinate determination element uses a least-squares methodology to determine the coordinate of said epipole.

29. An image processing system as defined in claim 21 in which said epipole generator generates said coordinates for said epipole v' as $F^T v' = 0$, where "F" is said fundamental matrix and "T" represents a transpose operation.

30. An image processing system as defined in claim 21 in which said epipole generator comprises:
   A. an epipolar line generator for generating, from the tensor T, a plurality of epipolar lines; and
   B. an epipole coordinate determination element for determining the coordinate of said epipole as the point of intersection of said epipolar lines.

31. An image processing system as defined in claim 22 in which said epipolar line generator generates each said epipolar line as the cross product of corresponding columns of two of the three matrices $E_j = \alpha_{1j1}, \alpha_{1j2}, \ldots, \alpha_{3j3}$ (j=1, 2, 3).

32. An image processing system as defined in claim 14 further comprising a planar view generator for generating said more than three views.

33. An image processing system as defined in claim 1, the system generating said image from more than three views,
   A. said planar view processor identifying, for each of a plurality of subsets "m" of three of said planar views, two of said views being the same for all of said subsets "m," a set $P_s$ of at least one point P in the scene which has a projection in all three views of the respective subset;
   B. said trilinear tensor generator generates, for each subset "m," a trilinear tensor $T_m$ having components $\alpha_{ijk,m}$;
   C. said image processing system further comprising a correspondence element for processing said trilinear tensors $T_m$ in accordance with a rank-4 constraint, thereby to generate a set of processed trilinear tensors $T_m'$ which are linear related to each other, the image generator utilizing at least one processed trilinear tensor for at least one subset to generate said image instead of the associated trilinear tensor for the same subset.

34. An image processing system as defined in claim 33 in which said each set $P_s$ comprises a plurality of points P, each point P having a projection in all three views of the respective set "m."

35. An image processing system as defined in claim 33 in which each said set $P_s$ comprises seven points P, each point P having a projection in all three views of the respective set "m."

36. An image processing system as defined in claim 33 in which said correspondence element comprises:
   A. a correspondence matrix generator for generating, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}$, $\alpha_{1j2,m}$, ..., $\alpha_{3j3,m}$ of the respective trilinear tensor $T_m$;

B. a concatenation element for concatenating the correspondence matrices $G_m$ for the respective subsets together, thereby to generate a concatenated correspondence matrix $CG_m$;

C. a rank-4 processing element for processing said concatenated correspondence matrix $CG_m$ in accordance with the rank-4 constraint, thereby to generate a processed concatenated correspondence matrix $CG_m$; and D. a processed trilinear tensor generator for generating from the processed concatenated correspondence matrix $CG_m$ the set of processed trilinear tensors $T_m'$.

37. An image processing system as defined in claim 36 in which:

A. said concatenation element concatenates the correspondence matrices $G_m$ such that columns of successive ones of the correspondence matrices $G_m$ form successive sets of columns of the concatenated correspondence matrix $CG_m$; and B. said processed trilinear tensor generator generates each processed trilinear tensor $T_m'$ associated with a subset "m" from the ones of the set of columns of the concatenated correspondence matrix associated with the correspondence matrix $G_m$ for the same subset "m."

38. A computer-implemented image processing method for generating an image of a scene from three views of the scene, the image processing method comprising the steps of:

A. identifying from said three planar views a set $P_s$ of at least one point P in the scene which has a projection in all three views;

B. generating from the set $P_s$ a trilinear tensor T having components $\alpha_{ijk}$ conforming to:

$$\alpha_{ijk}=v_i'b_{jk}-v_j''a_{ik}(i, j, k=1, 2, 3),$$

where $v_i'$ and $v_j'$ are components of vectors v' and v", and $a_{jk}$ and $b_{jk}$ are components of matrices A and B defined such that, for said point $P \subset P_s$ in the set, projection points p, p' and p" onto the respective first, second and third views have coordinates in the respective view given by p=[I,0]P (where "I" represents an identity matrix), p'≅[A,v']P (where "≅" represents equality up to a scale factor), and p"≅[B,v"]P, A, B, v' and v" being the same for projection points p, p' and p" for all points $P \subset P_s$; and C. utilizing the trilinear tensor T to generate said image.

39. A computer-implemented image processing method as defined in claim 38 in which said set $P_s$ comprises a plurality of points P, each point P having a projection in all three views.

40. A computer-implemented image processing method as defined in claim 39 in which said set $P_s$ comprises seven points P, each point P having a projection in all three views.

41. A computer-implemented image processing method as defined in claim 40 in which said trilinear tensor generating step includes the step of generating the components $\alpha_{ijk}$ of the trilinear tensor T in accordance with:

$$x''\alpha_{13.}{}^T p - x''x'\alpha_{33.}{}^T p + x'\alpha_{31.}{}^T p - \alpha_{11.}{}^T p = 0,$$

$$y''\alpha_{13.}{}^T p - y''x'\alpha_{33.}{}^T p + x'\alpha_{32.}{}^T p - \alpha_{12.}{}^T p = 0,$$

$$x''\alpha_{23.}{}^T p - x''y'\alpha_{33.}{}^T p + y'\alpha_{31.}{}^T p - \alpha_{21.}{}^T p = 0,$$

and $$y''\alpha_{23.}{}^T p - y''y'\alpha_{33.}{}^T p + y'\alpha_{32.}{}^T p - \alpha_{22.}{}^T p = 0,$$

for said points $P_s$, where each point p' has coordinates $(x', y', 1)^T$ and each point p" has coordinates $(x'', y'', 1)^T$, $\alpha_{ij.}$ for each "i" and "j" (i, j=1, 2, 3) represents a vector of said trilinear tensor, and "T" represents a transpose operation.

42. A computer-implemented image processing method as defined in claim 38 further comprising the step of generating said three planar views.

43. A computer-implemented image processing method as defined in claim 38 in which said image generation step includes the step of generating said image as a two-dimensional image.

44. A computer-implemented image processing method as defined in claim 43 in which said image generation step further includes the step of displaying the generated image.

45. A computer-implemented image processing method as defined in claim 43 in which said image is of said scene at a particular point in time, the image processing method further comprising the step of comparing said image to another image of said scene at a different point in time thereby to facilitate identification of differences in the scene at the respective points in time.

46. A computer-implemented image processing method as defined in claim 38 in which said image generation step includes the step of utilizing the trilinear tensor T to generate, from coordinates for projection points in two of said views for a point $P_x$ in the scene, coordinates for a corresponding projection point in the third of said views, the corresponding projection point comprising a point in said image.

47. A computer-implemented image processing method as defined in claim 46 in which said image generation step includes the step of generating the coordinates for the corresponding projection point by plugging into the trilinear tensor T the coordinates for the projection points in said two of said views.

48. A computer-implemented image processing method as defined in claim 38 in which said image generation step includes the step of utilizing the trilinear tensor T to generate a three-dimensional image of the scene.

49. A computer-implemented image processing method as defined in claim 48 further comprising the step of generating, from the three-dimensional image, a two-dimensional image comprising a novel view of said scene from a predetermined direction.

50. A computer-implemented image processing method as defined in claim 49 further comprising the step of displaying the image comprising the novel view.

51. A computer-implemented image processing method as defined in claim 48 in which said scene includes at least one object, the image processing method further comprising the step of comparing at least a portion of the image corresponding to the object and a predetermined model for said object.

52. A computer-implemented image processing method as defined in claim 51 further comprising the step of, if a difference is determined between the at least a portion of the image corresponding to the object and the predetermined model for said object, comparing said difference to a predetermined tolerance and generating an indication in response to the comparison.

53. A computer-implemented image processing method as defined in claim 51 in which said utilization step comprises the steps of:

A. generating a homography matrix $E_i$ from the trilinear tensor T;

B. generating coordinates for an epipole v' in said second view;

C. using the homography matrix $E_i$, said coordinates for said epipole v', and coordinates $(x_r, y_r)$ and $(x'_r, y'_r)$ of corresponding points $p_r$ and $p'_r$ in said respective first and second views to generate an affine depth value $\kappa_r$, thereby to provide coordinates for $(x, y, 1, \kappa_r)$ for a point $P_r$ in the scene.

54. A computer-implemented image processing method as defined in claim 53 in which said affine depth generation step includes the step of generating the affine depth value $\kappa_r$ in accordance with $p'_r \cong E_i\, p_r + \kappa\, v'$.

55. A computer-implemented image processing method as defined in claim 48 in which said utilization step includes the steps of:

A. generating a fundamental matrix F from the trilinear tensor T;

B. generating coordinates for an epipole v' in said second view;

C. using the fundamental matrix F, said coordinates for said epipole v', and coordinates $(x_r, y_r)$ and $(x'_r, y'_r)$ of corresponding points $p_r$ and $p'_r$ in said respective first and second views to generate an affine depth value $\kappa_r$, thereby to provide coordinates for $(x, y, 1, \kappa_r)$ for a point $P_r$ in the scene.

56. A computer-implemented image processing method as defined in claim 55 in which said fundamental matrix generating step includes the step of generating the fundamental matrix F as $E_j^T F + F^T E_j = 0$ (j=1, 2, 3), where $E_j$ are three matrices $E_j = \alpha_{1j1}, \alpha_{1j2}, \ldots, \alpha_{3j3}$ and "T" represents a transpose operation.

57. A computer-implemented image processing method as defined in claim 55, the method generating said image from more than three planar views of a scene, in which A. said point set identifying step includes the step of identifying, for each of a plurality of subsets "m" of three of said planar views, two of said views being the same for all of said subsets "m," a set $P_s$ at least one point P in the scene which has a projection in all three views of the respective subset;

B. said trilinear tensor generating step includes the step of generating, for each subset "m," a trilinear tensor $T_m$ having components $\alpha_{ijk,m}$;

C. said method further includes a correspondence matrix generating step comprising the steps of:
 i. generating, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$; and
 ii. concatenating the correspondence matrices $G_m$ for the respective subsets together, thereby to generate a concatenated correspondence matrix $CG_m$; and D. said fundamental matrix generating step includes the step of generating the fundamental matrix F as $C_k^T F + F^T C_k = 0$ (k=1, 2, 3, 4) where each $C_k$ represents one of four largest principal components of the concatenated correspondence matrix $CG_m$ and "T" represents a transpose operation.

58. A computer-implemented image processing method as defined in claim 57 in which said each said set $P_s$ comprises a plurality of points P, each point P having a projection in all three views.

59. A computer-implemented image processing method as defined in claim 58 in which each said set $P_s$ comprises seven points P, each point P having a projection in all three views.

60. A computer-implemented image processing method as defined in claim 57 further comprising the step of generating said three planar views.

61. A computer-implemented image processing method as defined in claim 57 in which said epipole generating step includes the step of generating said coordinates for said epipole v' as $F^T v' = 0$, where "F" is said fundamental matrix and "T" represents a transpose operation.

62. A computer-implemented image processing method as defined in claim 55 in which said epipole generating step includes the steps of A. generating, from the tensor T, a plurality of epipolar lines; and B. determining the coordinate of said epipole as the point of intersection of said epipolar lines.

63. A computer-implemented image processing method as defined in claim 62 in which said epipolar line generating step includes the step of generating each said epipolar line as the cross product of corresponding columns of two of the three matrices $E_j = \alpha_{1j1}, \alpha_{1j2}, \ldots, \alpha_{3j3}$ (j=1, 2, 3).

64. A computer-implemented image processing method as defined in claim 63, the method generating said image from more than three planar views of a scene, in which A. said point set identifying step includes the step of identifying, for each of a plurality of subsets "m" of three of said planar views, two of said views being the same for all of said subsets "m," a set $P_s$ at least one point P in the scene which has a projection in all three views of the respective subset;

B. said trilinear tensor generating step includes the step of generating, for each subset "m," a trilinear tensor $T_m$ having components $\alpha_{ijk,m}$;

C. said method further comprises a correspondence matrix generating step comprising the steps of:
 i. generating, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$; and
 ii. concatenating the correspondence matrices $G_m$ for the respective subsets together, thereby to generate a concatenated correspondence matrix $CG_m$; and D. said epipolar line generating step includes the step of generating each said epipolar line as the cross product of corresponding columns of four largest principal components of the concatenated correspondence matrix $CG_m$.

65. A computer-implemented image processing method as defined in claim 64 in which said each said set $P_s$ comprises a plurality of points P, each point P having a projection in all three views.

66. A computer-implemented image processing method as defined in claim 65 in which each said set $P_s$ comprises seven points P, each point P having a projection in all three views.

67. A computer-implemented image processing method as defined in claim 63 in which said epipole coordinate determination step includes the step of using a least-squares methodology to determine the coordinate of said epipole.

68. A computer-implemented image processing method as defined in claim 64 further comprising the step of generating said three planar views.

69. A computer-implemented image processing method as defined in claim 55 in which said affine depth generating step includes the step of generating said affine depth $\kappa$ in conformance with $p'_r \cong [v']F\ p_r + \kappa\ v'$.

70. A computer-implemented image processing method as defined in claim 38, the method generating said image from more than three planar views of a scene, in which
   A. said point set identifying step includes the step of identifying, for each of a plurality of subsets "m" of three of said planar views, a set $P_s$ at least one point in the scene which has a projection in all three views of the respective subset;
   B. said trilinear tensor generating step includes the step of generating, for each subset "m," a trilinear tensor $T_m$ having components $\alpha_{ijk,m}$;
   C. said method further comprising a correspondence step for processing said trilinear tensors $T_m$ in accordance with a rank-4 constraint, thereby to generate a set of processed trilinear tensors $T_m'$ which are linear related to each other, the utilization element utilizing at least one processed trilinear tensor for at least one subset to generate said image instead of the associated trilinear tensor for the same subset.

71. A computer-implemented image processing method as defined in claim 70 in which said each said set $P_s$ comprises a plurality of points P, each point P having a projection in all three views.

72. A computer-implemented image processing method as defined in claim 71 in which each said set $P_s$ comprises seven points P, each point P having a projection in all three views.

73. A computer-implemented image processing method as defined in claim 72 further comprising the step of generating said three planar views.

74. A computer-implemented image processing method as defined in claim 70 in which said correspondence step comprises the steps of:
   A. generating, for each trilinear tensor $T_m$ associated with a subset of views "m," two of said views being the same for all of said subsets "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$;
   B. concatenating the correspondence matrices $G_m$ for the respective subsets together, thereby to generate a concatenated correspondence matrix $CG_m$;
   C. processing said concatenated correspondence matrix $CG_m$ in accordance with the rank-4 constraint, thereby to generate a processed concatenated correspondence matrix $CG_m$; and
   D. generating from the processed concatenated correspondence matrix $CG_m$ the set of processed trilinear tensors $T_m'$.

75. A computer-implemented image processing method as defined in claim 74 in which:
   A. said concatenation step includes the step of concatenating the correspondence matrices $G_m$ such that columns of successive ones of the correspondence matrices $G_m$ form successive sets of columns of the concatenated correspondence matrix $CG_m$; and
   B. said processed trilinear tensor generating step includes the step of generating each processed trilinear tensor $T_m'$ associated with a subset "m" from the ones of the set of columns of the concatenated correspondence matrix associated with the correspondence matrix $G_m$ for the same subset "m."

76. A computer program product for enabling a computer to generate an image of a scene from three views of the scene, the three views having a set $P_s$ of at least one point P in the scene which has a respective projection in all three views, the computer program product comprising a computer-readable medium having encoded thereon:
   A. a trilinear tensor generation module for enabling said computer to generate from the set $P_s$ a trilinear tensor T having components $\alpha_{ijk}$ conforming to $$\alpha_{ijk} = v_i' b_{jk} - v_j'' a_{ik}\ (i,\ j,\ k=1,\ 2,\ 3),$$

where $v_i'$ and $v_j''$ are components of vectors v' and v", and $a_{jk}$ and $b_{jk}$ are components of matrices A and B defined such that, for each point $P \subset P_s$ in the set, projection points p, p' and p" onto the respective first, second and third views have coordinates in the respective view given by
   p=[I,0]P (where "I" represents an identity matrix),
   p'≅[A,v']P (where "≅" represents equality up to a scale factor), and
   p"≅[B,v"]P,
   A, B, v' and v" being the same for projection points p, p' and p" for point $P \subset P_s$; and
   B. an image generation module for enabling said computer to utilize the trilinear tensor T to generate the image of said scene.

77. A computer program product as defined in claim 76 further comprising a planar view processing module for enabling said computer to identify from the three planar views the set $P_s$ of at least one point P in the scene which has a respective projection in all three views.

78. A computer program product as defined in claim 77 in which said image generation module enables said computer to generate said image as a two-dimensional image.

79. A computer program product as defined in claim 78 in which said image generator module further enables said computer to display the image generated thereby.

80. A computer program product as defined in claim 78 in which said image generation module enables said computer to utilize the trilinear tensor T to generate, from coordinates for projection points in two of said views for a point $P_x$ in the scene, coordinates for a corresponding projection point in the third of said views, the corresponding projection point comprising a point in said image.

81. A computer program product as defined in claim 80 in which said image generation module enables said computer to generate the coordinates for the corresponding projection point by plugging into the trilinear tensor T the coordinates for the projection points in said two of said views.

82. A computer program product as defined in claim 78 in which said image is of said scene at a particular point in time, the computer program product further including a comparator module for enabling said computer to compare said image to another image of said scene at a different point in time thereby to facilitate the identification of differences in the scene at the respective points in time.

83. A computer program product as defined in claim 76 in which said set $P_s$ comprises a plurality of points P, each point P having a projection in all three views.

84. A computer program as defined in claim 83 in which said set $P_s$ comprises seven points P, each point P having a projection in all three views.

85. A computer program product as defined in claim 76 further comprising a planar view generator module for enabling said computer to generate said three planar views.

86. A computer program product as defined in claim 85 in which said trilinear tensor generation module enables said computer to generate the components $\alpha_{ijk}$ of the trilinear tensor T in accordance with $$x''\alpha_{13}{}^T p - x''x'\alpha_{33}{}^T p + x'\alpha_{31}{}^T p - \alpha_{11}{}^T p = 0,$$

$$y''\alpha_{13}{}^T p - y''x'\alpha_{33}{}^T p + x'\alpha_{32}{}^T p - \alpha_{12}{}^T p = 0,$$

$$x''\alpha_{23}{}^T p - x''y'\alpha_{33}{}^T p + y'\alpha_{31}{}^T p - \alpha_{21}{}^T p = 0,$$

and $$y''\alpha_{23}{}^T p - y''y'\alpha_{33}{}^T p + y'\alpha_{32}{}^T p - \alpha_{22}{}^T p = 0,$$

for said points $P_s$, where each point p' has coordinates (x', y', 1)$^T$ and each point p'' has coordinates (x'', y'', 1)$^T$, $\alpha_{ij}$ for each "i" and "j" (i, j=1, 2, 3) represents a vector of said trilinear tensor, and "T" represents a transpose operation.

87. A computer program product as defined in claim 76 in which said image generator module enables said computer to generate said image as a three-dimensional image.

88. A computer program product as defined in claim 87 further comprising a novel view generator module for enabling said computer to generate, from said three-dimensional image, a two-dimensional image comprising a novel view of said scene from a predetermined direction.

89. A computer program product as defined in claim 88 in which said image generator module further enables said computer to display the image generated thereby.

90. A computer program product as defined in claim 89, the computer program product enabling said computer to generate said image from more than three views, A. said computer program product comprising a planar view processor module for enabling said computer to identify, for each of a plurality of subsets "m" of three of said planar views, two of said views being the same for all of said subsets "m," a set $P_s$ of at least one point P in the scene which has a projection in all three views of the respective subset;

B. said trilinear tensor generator module enabling said computer to generate, for each subset "m," a trilinear tensor $T_m$ having components $\alpha_{ijk,m}$;

C. said computer program product further comprising a correspondence matrix generating module comprising:
   i. a correspondence matrix generator module for enabling said computer to generate, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}$, $\alpha_{1j2,m}$, . . . , $\alpha_{3j3,m}$ of the respective trilinear tensor $T_m$; and
   ii. a concatenation module for enabling said computer to concatenate the correspondence matrices $G_m$ for the respective subsets together, thereby to generate a concatenated correspondence matrix $CG_m$; and D. said epipolar line generator module enabling said computer to generate each said epipolar line as the cross product of corresponding columns of four largest principal components of the concatenated correspondence matrix $CG_m$.

91. A computer program product as defined in claim 90 in which said each set $P_s$ comprises a plurality of points P, each point P having a projection in all three views of the respective set "m."

92. A computer program product as defined in claim 91 in which each said set $P_s$ comprises seven points P, each point P having a projection in all three views of the respective set "m."

93. A computer program product as defined in claim 90 further comprising a planar view generator module for enabling said computer to generate said more than three views.

94. A computer program product as defined in claim 87 in which said scene includes at least one object, the computer program product further comprising an image comparator module for enabling said computer to perform a comparison operation in connection with a portion of the image corresponding to the object and a predetermined model for said object.

95. A computer program product as defined in claim 94 in which the image comparator module further enables said computer to, if it determines that a difference exists between the portion of the image corresponding to the object and the predetermined model, further compare said difference with a predetermined tolerance.

96. A computer program product as defined in claim 87 in which said image generator module comprises:
   A. a fundamental matrix generator module for enabling said computer to generate a fundamental matrix F from the trilinear tensor T;
   B. an epipole generator module for enabling said computer to generate coordinates for an epipole v' in said second view;
   C. an affine depth generator module for enabling said computer to use the fundamental matrix F, said coordinates for said epipole v', and coordinates $(x_r, y_r)$ and $(x'_r, y'_r)$ of corresponding points $p_r$ and $p'_r$ in said respective first and second views to generate an affine depth value $\kappa_r$, thereby to provide coordinates for $(x, y, 1, \kappa_r)$ for a point $P_r$ in the scene.

97. A computer program product as defined in claim 96 in which said fundamental matrix generator module for enabling said computer to generate the fundamental matrix F as $E_j^T F + F^T E_j = 0$ (j=1, 2, 3), where $E_j$ are three matrices $E_j = \alpha_{1j1}, \alpha_{1j2}, \ldots, \alpha_{3j3}$ and "T" represents a transpose operation.

98. A computer program product as defined in claim 97, the computer program product enabling said computer to generate said image from more than three views, A. the computer program product including a planar view processor module for enabling said computer to identify, for each of a plurality of subsets "m" of three of said planar views, two of said views being the same for all of said subsets "m," a set $P_s$ having at least one point P in the scene which has a projection in all three views of the respective subset;

B. said trilinear tensor generator module for enabling said computer to generate, for each subset "m," a trilinear tensor $T_m$ having components $\alpha_{ijk,m}$;

C. said computer program product further comprising a correspondence matrix generating module comprising:
   i. a correspondence matrix generator module for enabling said computer to generate, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}$, $\alpha_{1j2,m}$, . . . , $\alpha_{3j3,m}$ of the respective trilinear tensor $T_m$;
   ii. a concatenation module for enabling said computer to concatenate the correspondence matrices $G_m$ for the respective subsets together, thereby to generate a concatenated correspondence matrix $CG_m$; and D. said fundamental matrix generator module enabling said computer to generate the fundamental matrix F as

39

$C_k^T F + F^T C_k = 0$ (k=1, 2, 3, 4) where each $C_k$ represents one of four largest principal components of the concatenated correspondence matrix $CG_m$ and "T" represents a transpose operation.

99. A computer program product as defined in claim 98 in which said each said set $P_s$ comprises a plurality of points P, each point P having a projection in all three views.

100. A computer program product as defined in claim 91 in which each said set $P_s$ comprises seven points P, each point P having a projection in all three views.

101. A computer program product as defined in claim 96 in which said affine depth generator module for enabling said computer to generate said affine depth κ in conformance with $p'_r \cong [v']F\, p_r + \kappa\, v'$.

102. A computer program product as defined in claim 96 in which said image generator module comprises:

A. a homography generator module for enabling said computer to generate a homography matrix $E_i$ from the trilinear tensor T;

B. an epipole generator module for enabling said computer to generate coordinates for an epipole v' in said second view;

C. an affine depth generator module for enabling said computer to use the homography matrix $E_i$, said coordinates for said epipole v', and coordinates $(x_r, y_r)$ and $(x'_r, y'_r)$ of corresponding points $p_r$ and $p'_r$ in said respective first and second views to generate an affine depth value $\epsilon_r$, thereby to provide coordinates for (x, y, 1, $\kappa_r$) for a point $P_r$ in the scene.

103. A computer program product as defined in claim 102 in which said affine depth generator module for enabling said computer to generate the affine depth value $\kappa_r$ in accordance with $p'_r \cong E_i\, p_r + \kappa\, v'$.

104. A computer program product as defined in claim 98 further comprising a planar view generator module for enabling said computer to generate said more than three views.

105. A computer program product as defined in claim 104 in which said epipole coordinate determination module for enabling said computer to use a least-squares methodology to determine the coordinate of said epipole.

106. A computer program product as defined in claim 98 in which said epipole generator module enables said computer to generate said coordinates for said epipole v' as $F^T v'=0$, where "F" is said fundamental matrix and "T" represents a transpose operation.

107. A computer program product as defined in claim 98 in which said epipole generator module comprises:

A. an epipolar line generator module for enabling said computer to generate, from the tensor T, a plurality of epipolar lines; and B. an epipole coordinate determination module for enabling said computer to determine the coordinate of said epipole as the point of intersection of said epipolar lines.

108. A computer program product as defined in claim 91 in which said epipolar line generator module enables said computer to generate each said epipolar line as the cross product of corresponding columns of two of the three matrices $E_j = \alpha_{1j1}, \alpha_{1j2}, \ldots, \alpha_{3j3}$ (j=1, 2, 3).

109. A computer program product as defined in claim 96, the computer program product enabling said computer to generate said image from more than three views, A. said computer program product including a planar view processor module for enabling said computer to

40 identify, for each of a plurality of subsets "m" of three of said planar views, two of said views being the same for all of said subsets "m," a set $P_s$ of at least one point P in the scene which has a projection in all three views of the respective subset;

B. said trilinear tensor generator module enabling said computer to generate, for each subset "m," a trilinear tensor $T_m$ having components $\alpha_{ijk,m}$;

C. said computer program product further comprising a correspondence module for enabling said computer to process said trilinear tensors $T_m$ in accordance with a rank-4 constraint, thereby to generate a set of processed trilinear tensors $T_m'$ which are linear related to each other, the image generator utilizing at least one processed trilinear tensor for at least one subset to generate said image instead of the associated trilinear tensor for the same subset.

110. A computer program product as defined in claim 109 in which said each set $P_s$ comprises a plurality of points P, each point P having a projection in all three views of the respective set "m."

111. A computer program product as defined in claim 109 in which each said set $P_s$ comprises seven points P, each point P having a projection in all three views of the respective set "m."

112. A computer program product as defined in claim 109 in which said correspondence module comprises:

A. a correspondence matrix generator module for enabling said computer to generate, for each trilinear tensor $T_m$ associated with a subset of views "m," a two-dimensional correspondence matrix $G_m$ having a plurality of rows and columns, each column "j" of the correspondence matrix $G_m$ containing the elements $\alpha_{1j1,m}, \alpha_{1j2,m}, \ldots, \alpha_{3j3,m}$ of the respective trilinear tensor $T_m$;

B. a concatenation module for enabling said computer to concatenate the correspondence matrices $G_m$ for the respective subsets together, thereby to generate a concatenated correspondence matrix $CG_m$;

C. a rank-4 processing module for enabling said computer to process said concatenated correspondence matrix $CG_m$ in accordance with the rank-4 constraint, thereby to generate a processed concatenated correspondence matrix $CG_m$; and D. a processed trilinear tensor generator module for enabling said computer to generate from the processed concatenated correspondence matrix $CG_m$ the set of processed trilinear tensors $T_m'$.

113. A computer program product as defined in claim 112 in which:

A. said concatenation module enables said computer to concatenate the correspondence matrices $G_m$ such that columns of successive ones of the correspondence matrices $G_m$ form successive sets of columns of the concatenated correspondence matrix $CG_m$; and B. said processed trilinear tensor generator module enables said computer to generate each processed trilinear tensor $T_m'$ associated with a subset "m" from the ones of the set of columns of the concatenated correspondence matrix associated with the correspondence matrix $G_m$ for the same subset "m."

* * * * *